(12) United States Patent
Haynes

(10) Patent No.: US 11,898,683 B2
(45) Date of Patent: Feb. 13, 2024

(54) PLUMBING FITTING

(71) Applicant: Lake Products Limited, Auckland (NZ)

(72) Inventor: Andrew Leo Haynes, Helensville (NZ)

(73) Assignee: Lake Products Limited, Auckland (NZ)

( * ) Notice: Subject to any disclaimer, the term of this patent is extended or adjusted under 35 U.S.C. 154(b) by 0 days.

(21) Appl. No.: 17/382,563

(22) Filed: Jul. 22, 2021

(65) Prior Publication Data

US 2023/0028167 A1  Jan. 26, 2023

(51) Int. Cl.
*F16L 55/11* (2006.01)
*F16L 43/02* (2006.01)
*F16L 29/00* (2006.01)

(52) U.S. Cl.
CPC ......... *F16L 55/1108* (2013.01); *F16L 29/007* (2013.01); *F16L 43/02* (2013.01)

(58) Field of Classification Search
CPC ...... F16L 55/11; F16L 55/1108; F16L 29/007; F16L 55/07; F16L 43/02
See application file for complete search history.

(56) References Cited

U.S. PATENT DOCUMENTS

| | | | |
|---|---|---|---|
| D28,656 S | 5/1898 | Savage | |
| 1,542,406 A * | 6/1925 | Pfeiffer | F16L 29/007 251/149 |
| 2,704,090 A * | 3/1955 | Potts | F16L 55/1152 138/90 |
| 3,167,320 A * | 1/1965 | Kyle | H01R 13/533 174/77 R |
| 3,434,694 A * | 3/1969 | Skinner | F16K 1/04 137/315.27 |
| 3,893,487 A * | 7/1975 | Engelking | B65D 39/08 220/304 |
| 3,999,570 A * | 12/1976 | Clements | F16K 24/00 251/339 |
| 4,139,023 A | 2/1979 | Turley | |
| 4,286,629 A * | 9/1981 | Streich | F16L 55/11 405/203 |
| 4,659,115 A * | 4/1987 | Cameron | E21B 33/068 285/12 |
| 4,923,221 A * | 5/1990 | Taylor | F16L 55/1152 285/376 |

(Continued)

FOREIGN PATENT DOCUMENTS

| | | | | |
|---|---|---|---|---|
| DE | 9410371 U1 | * | 10/1994 | |
| EP | 1972867 A1 | * | 9/2008 | ............. F16K 3/246 |

(Continued)

*Primary Examiner* — David Colon-Morales
(74) *Attorney, Agent, or Firm* — Foley & Lardner LLP

(57) ABSTRACT

A plumbing fitting for selectively allowing the passage of a fluid therethrough includes an elongate body with a first open end and a second open end, with a passageway providing for fluid communication between the first open end and the second open end, where at least one of the first open end and/or the second open end include a connection arrangement for connection with a further plumbing fitting or fixture, and a valve for selectively sealing or unsealing the passageway to allow for a flow of fluid between each of the open ends, with the valve being operable from the first open end or the second open end.

71 Claims, 15 Drawing Sheets

(56) References Cited

U.S. PATENT DOCUMENTS

| | | | |
|---|---|---|---|
| 4,986,502 A * | 1/1991 | Ceroke | F16K 51/00 251/351 |
| D354,554 S | 1/1995 | Newman et al. | |
| 5,381,832 A * | 1/1995 | Mitsui | F16L 55/1108 251/297 |
| 5,388,288 A * | 2/1995 | Fell, Sr. | F16L 55/11 4/679 |
| 5,452,748 A * | 9/1995 | Simmons | F16L 19/0656 285/392 |
| 5,735,307 A * | 4/1998 | Charron | F16K 5/0642 251/315.01 |
| 5,904,377 A * | 5/1999 | Throup | F16L 55/11 285/298 |
| D418,210 S | 12/1999 | Roesch | |
| 6,116,285 A * | 9/2000 | Wilson | F16L 55/1108 138/92 |
| D445,170 S | 7/2001 | Speicher | |
| 6,378,912 B1* | 4/2002 | Condon | F16L 5/06 4/596 |
| D466,595 S | 12/2002 | Glanville | |
| 6,688,336 B2* | 2/2004 | Trichard | F16L 55/1108 138/91 |
| 7,163,028 B1* | 1/2007 | Atkinson | F16L 55/1152 285/8 |
| 7,204,267 B1* | 4/2007 | Persico | E03C 1/12 137/357 |
| 7,328,723 B1* | 2/2008 | Van Meter | F16L 55/115 138/89.4 |
| D613,818 S | 4/2010 | Kojima | |
| D712,013 S | 8/2014 | Mather et al. | |
| 9,366,278 B2* | 6/2016 | Ishida | F16B 33/004 |
| D770,601 S | 11/2016 | Melo et al. | |
| 9,599,225 B2* | 3/2017 | Nohara | F16J 13/12 |
| D788,886 S | 6/2017 | Salzer | |
| 9,683,685 B2* | 6/2017 | Ismert | E03C 1/021 |
| D816,191 S | 4/2018 | Cove et al. | |
| 10,066,776 B2* | 9/2018 | Park | E03C 1/00 |
| D899,564 S | 10/2020 | Nachawi | |
| 10,794,345 B2* | 10/2020 | Horstmann | F16L 55/1108 |
| 11,022,300 B2* | 6/2021 | Pschirer | F22B 37/74 |
| 2008/0202596 A1* | 8/2008 | Kato | F16L 55/1108 137/197 |
| 2010/0163131 A1* | 7/2010 | Fehr | F16L 55/1108 4/293 |
| 2012/0067436 A1* | 3/2012 | Jacoway | F16L 5/00 137/15.18 |
| 2012/0085453 A1* | 4/2012 | Lourigan | F16L 55/1108 138/89 |
| 2014/0232107 A1 | 8/2014 | Raasch | |
| 2015/0023753 A1* | 1/2015 | Dostinov | F16L 55/1108 411/2 |
| 2021/0341057 A1* | 11/2021 | Nguyen | F16J 15/022 |
| 2022/0178281 A1* | 6/2022 | Zheng | F02C 7/06 |

FOREIGN PATENT DOCUMENTS

| | | | | |
|---|---|---|---|---|
| FR | 1195633 A | * | 11/1959 | |
| GB | 2503561 A | * | 1/2014 | E21B 41/0007 |

* cited by examiner

PLUMBING FITTING

FIELD OF THE INVENTION

This invention relates to a plumbing fitting.

BACKGROUND

Buildings are typically constructed by forming foundations, constructing the framing, installing plumbing and wiring, installing insulation, then lining with plasterboard to form a wall cavity. The plasterboard is plastered and decorated, for example with paint or wallpaper. The plumbing fittings, such as taps and shower fittings, are installed after the walls have been decorated. During the construction process, it is often necessary to test the plumbing to check for leaks. The testing is usually carried out before the walls are lined. As the final plumbing fittings have not yet been installed, there are a number of open pipe outlets. To allow the plumbing to be tested without water flowing out from all the outlets, a sealing plug is used to block each outlet. The sealing plugs are usually left in place during construction and removed when the final plumbing fittings are installed. The sealing plugs are a temporary system that is used while testing is being carried out.

Previously known sealing plugs include short brass caps and plugs, or short plastic caps and plugs. It is also known to provide plugs that have elongate bodies. The plugs are closed at the end to effectively block the outlets when installed. The plugs are long enough so that when one end is connected to the plumbing outlet, the other end is outside of the wall cavity after the plasterboard has been installed.

However, a problem can occur when the plug is removed. If water remains in the plumbing, when the plug is removed the water will simply flow out of the outlet in an uncontrolled manner. The water may collect in the wall cavity, damage the other wall components, or cause other damage.

SUMMARY OF THE INVENTION

It is an object of at least preferred embodiments of the present invention to provide a plumbing fitting that will address the problems of the prior art, and/or to at least provide the public with a useful alternative.

In accordance with a first aspect, there is provided a plumbing fitting for selectively allowing the passage of a fluid therethrough, said plumbing fitting comprising:

an elongate body comprising a first open end and a second open end, with a passageway providing for fluid communication between each of said first open end and said second open end;

at least one of said first open end and/or said second open end comprises a connection arrangement for connection with a further plumbing fitting or fixture; and a valve for selectively sealing or unsealing said passageway to allow for a flow of fluid between each of said open ends, the valve being operable from the first open end or the second open end.

In an embodiment, said elongate body is of a pre-determined length.

In an embodiment, the pre-determined length is sufficient for said elongate body, when connected to a further plumbing fitting or fixture, to provide for one of said open ends to be located outside of a wall cavity or a wall cavity to be formed.

In an embodiment, when the elongate body is viewed in an axial direction between said first open end and said second open end, the exterior surface:

i. substantially circular, or ii. is of a profile, or is of a maximum outer profile, circumscribed by an axial rotation of said elongate body that is substantially circular, or iii. is shaped such that a maximum exterior diameter of said elongate body provided for connection with a further plumbing fitting or fixture is of substantially the same or a reduced exterior diameter with respect to a maximum exterior diameter of said elongate body adjacent to said end of said elongate body provided for the connection to the further plumbing fitting or fixture.

In an embodiment, an end of said elongate body provided for connection to a further plumbing fitting of fixture is of a reduced maximum exterior diameter with respect to the remainder of said elongate body.

In an embodiment, one of said first open end or said second open end is of a smaller maximum exterior diameter with respect to the other open end.

In an embodiment, a region of an end of said elongate body provided for connection with a further plumbing fitting or fixture has a substantially smooth exterior surface, or a substantially uninterrupted exterior surface.

In an embodiment, each end of said elongate body comprises of said region, each of said regions being of a substantially smooth exterior surface, or a substantially uninterrupted exterior surface.

In an embodiment, one end of said elongate body comprises of said region.

In an embodiment, the region is provided directly at an end and extends for a pre-determined longitudinal length along said elongate body.

In an embodiment, said pre-determined longitudinal length is a length sufficient to extend from the end connected to the further plumbing fitting or fixture to a location outside or beyond of a wall cavity or a wall cavity to be formed.

In an embodiment, said elongate body comprises of one or more exterior surface recesses, said recesses spaced about or along the elongate body.

In an embodiment, one or more of said recesses extends substantially longitudinally along said elongate body.

In an embodiment, one or more of said recesses extended substantially radially about said elongate body.

In an embodiment, said one or more exterior surface recesses are positioned between each of said first open end and said second open end.

In an embodiment, said one or more exterior surface recesses are positioned away from an end which is to be connected to the further plumbing fitting or fixture.

In an embodiment, the connection arrangement for connection with a further plumbing fitting or fixture comprises a threaded member configured to attach to a plumbing fitting.

In an embodiment, a first sealing member seals the threaded member against the plumbing fitting.

In an embodiment, the first sealing member is a washer.

In an embodiment, the elongate body comprises a groove around the circumference of the first end.

In an embodiment, the first sealing member sits in the groove.

In an embodiment, the valve is located at the first end.

In an embodiment, the valve is located at the second end.

In an embodiment, the valve is located between the first end and the second end.

In an embodiment, the valve comprises a plug, and a second sealing member.

In an embodiment, the plug seals the valve and can be unsealed by a tool inserted from the first end and/or the second end.

In an embodiment, the plug comprises at least one drainage channel.

In an embodiment, the plug is a screw.

In an embodiment, the screw is receivable or engageable by a screwdriver.

In an embodiment, the second sealing member is an O-ring.

In an embodiment, releasing the valve allows fluid in the plumbing fitting to flow from the first end to the second end.

In an embodiment, the valve is a spring valve.

In an embodiment, the valve is a lever valve.

In an embodiment, the first end comprises the connection arrangement for connection with a further plumbing fitting or fixture.

In an embodiment, the second end is an outlet end.

In an embodiment, the second end comprises a sealing washer.

A plumbing fitting for selectively allowing the passage of a fluid therethrough, said plumbing fitting comprising:
an elongate body comprising a first open end and a second open end, with a passageway providing for fluid communication between each of said first open end and said second open end;
at least one of said first open end and/or said second open end comprises a connection arrangement configured for rotatable connection with a further plumbing fitting or fixture;
a rotatable valve for selectively sealing or unsealing said passageway to allow for a flow of fluid between each of said open ends, wherein the rotation direction of the valve to unseal said passageway and the rotation direction of the connection arrangement to tighten the elongate body to the further plumbing fitting are the same direction.

In an embodiment, the connection arrangement is a threaded connection and the rotatable valve comprises a threaded connection.

In an embodiment, said elongate body is of a pre-determined length.

In an embodiment, the pre-determined length is sufficient for said elongate body, when connected to a further plumbing fitting or fixture, to provide for one of said open ends to be located outside of a wall cavity or a wall cavity to be formed.

In an embodiment, when the elongate body is viewed in an axial direction between said first open end and said second open end, the exterior surface:
  i. substantially circular, or
  ii. is of a profile, or is of a maximum outer profile, circumscribed by an axial rotation of said elongate body that is substantially circular, or
  iii. is shaped such that a maximum exterior diameter of said elongate body provided for connection with a further plumbing fitting or fixture is of substantially the same or a reduced exterior diameter with respect to a maximum exterior diameter of said elongate body adjacent to said end of said elongate body provided for the connection to the further plumbing fitting or fixture.

In an embodiment, an end of said elongate body provided for connection to a further plumbing fitting of fixture is of a reduced maximum exterior diameter with respect to the remainder of said elongate body.

In an embodiment, one of said first open end or said second open end is of a smaller maximum exterior diameter with respect to the other open end.

In an embodiment, a region of an end of said elongate body provided for connection with a further plumbing fitting or fixture has a substantially smooth exterior surface, or a substantially uninterrupted exterior surface.

In an embodiment, each end of said elongate body comprises of said region, each of said regions being of a substantially smooth exterior surface, or a substantially uninterrupted exterior surface.

In an embodiment, one end of said elongate body comprises of said region.

In an embodiment, the region is provided directly at an end and extends for a pre-determined longitudinal length along said elongate body.

In an embodiment, said pre-determined longitudinal length is a length sufficient to extend from the end connected to the further plumbing fitting or fixture to a location outside or beyond of a wall cavity or a wall cavity to be formed.

In an embodiment, said elongate body comprises of one or more exterior surface recesses, said recesses spaced about or along the elongate body.

In an embodiment, one or more of said recesses extends substantially longitudinally along said elongate body.

In an embodiment, one or more of said recesses extended substantially radially about said elongate body.

In an embodiment, said one or more exterior surface recesses are positioned between each of said first open end and said second open end.

In an embodiment, said one or more exterior surface recesses are positioned away from an end which is to be connected to the further plumbing fitting or fixture.

In an embodiment, a first sealing member seals the threaded member against the plumbing fitting.

In an embodiment, the first sealing member is a washer.

In an embodiment, the elongate body comprises a groove around the circumference of the first end.

In an embodiment, the first sealing member sits in the groove.

In an embodiment, the screw is located at the first end.

In an embodiment, the screw is located at the second end.

In an embodiment, the screw is located between the first end and the second end.

In an embodiment, the screw comprises a second sealing member.

In an embodiment, the screw is operable by a tool inserted from the first end and/or the second end.

In an embodiment, the screw comprises at least one drainage channel.

In an embodiment, the screw is receivable or engageable by a Philips-head screwdriver.

In an embodiment, the second sealing member is an O-ring.

In an embodiment, releasing the valve allows fluid in the plumbing fitting to flow from the first end to the second end.

In an embodiment, the first end comprises the connection arrangement for connection with a further plumbing fitting or fixture.

In an embodiment, the second end is an outlet end.

The term 'comprising' as used in this specification and claims means 'consisting at least in part of'. When interpreting statements in this specification and claims which include the term 'comprising', other features besides the features prefaced by this term in each statement can also be present. Related terms such as 'comprise' and 'comprised' are to be interpreted in a similar manner.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

This invention may also be said broadly to consist in the parts, elements and features referred to or indicated in the specification of the application, individually or collectively, and any or all combinations of any two or more said parts, elements or features, and where specific integers are mentioned herein which have known equivalents in the art to which this invention relates, such known equivalents are deemed to be incorporated herein as if individually set forth.

As used herein the term '(s)' following a noun means the plural and/or singular form of that noun.

As used herein the term 'and/or' means 'and' or 'or', or where the context allows both.

The invention consists in the foregoing and also envisages constructions of which the following gives examples only.

BRIEF DESCRIPTION OF THE DRAWINGS

The present invention will now be described by way of example only and with reference to the accompanying drawings.

DETAILED DESCRIPTION OF A PREFERRED EMBODIMENT

Figure 1:
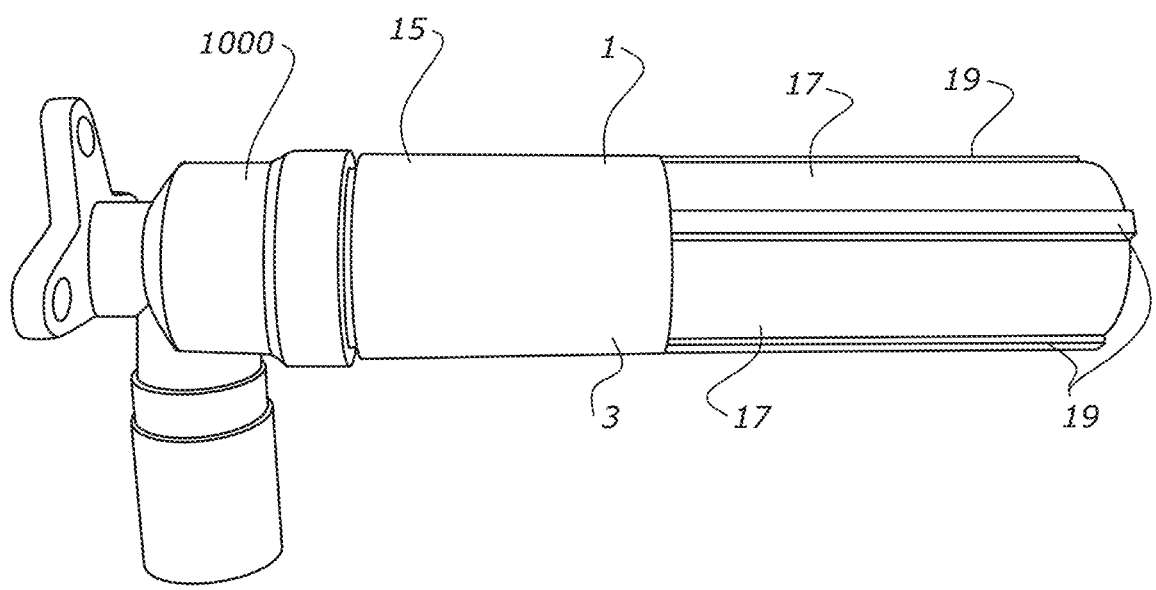
FIG. 1 is a perspective view from the side of a first embodiment of a plumbing fitting attached to a further plumbing fitting.
Figure 2:
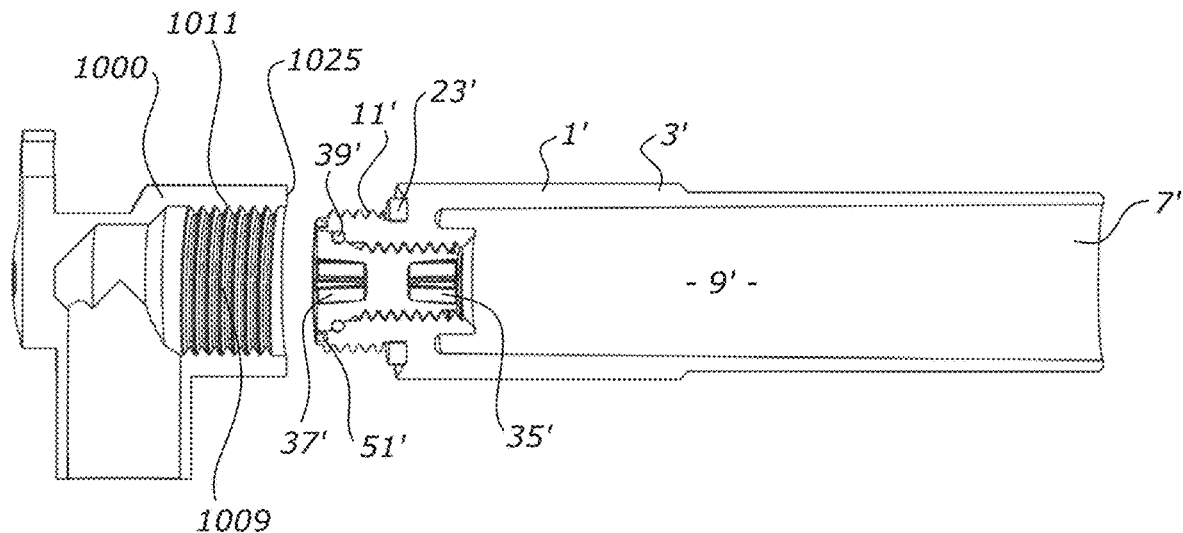
FIG. 2 is a cross-sectional view of another embodiment of the plumbing fitting before being attached to the further plumbing fitting.
Figure 3:
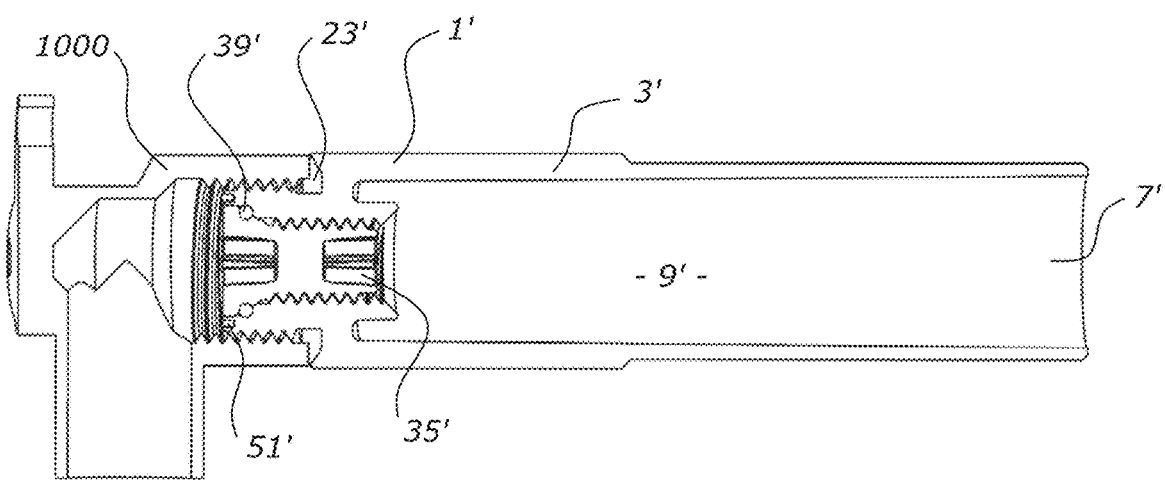
FIG. 3 is a cross-sectional view of the plumbing fitting of FIG. 2 attached to the further plumbing fitting.

With reference to FIGS. 1 and 4 to 19, a first preferred embodiment of a plumbing fitting 1 will now be described. FIG. 1 shows the plumbing fitting 1 connected to a further plumbing fitting 1000. The further plumbing fitting 1000 shown in FIGS. 1 to 3 is a conventional 90° elbow fitting with an internally threaded outlet (shown in FIGS. 2 and 3). The first embodiment of the plumbing fitting 1 described herein may also be used with any other suitable plumbing fitting, coupling or fixture with an outlet having an internally threaded outlet, such as a tee fitting, a 45° elbow, or a wye fitting.

The plumbing fitting 1 is configured to manage the flow of fluids through the passageway 1009 of the elbow 1000. In particular, the plumbing fitting 1 blocks the outlet of the elbow 1000 and prevents fluid from leaving the elbow 1000 through its outlet. In addition to blocking the outlet of the elbow 1000, the plumbing fitting 1 selectively allows the passage of a fluid therethrough. This allows water to flow from the elbow 1000 and through the plumbing fitting 1 when required, while the plumbing fitting 1 remains in place. As a result, when the plumbing fitting 1 is eventually removed and the final desired plumbing fittings are installed, there will be no water remaining in the pipework that can flow out of the elbow 1000 and damage the wall and/or the surroundings. As will be described in more detail below, the plumbing fitting 1 is installed manually, that is, the plumbing fitting 1 is hand tightened. The plumbing fitting 1 is also removed manually.

FIGS. 4 to 11 and 15 show many of the features of the plumbing fitting 1. The plumbing fitting 1 has an elongate body 3 with a first open end 5, a second open end 7 and a passageway 9 between the first open end 5 and the second open end 7. The plumbing fitting 1 has a connection arrangement 11 for connection with the elbow 1000. The plumbing fitting also has a valve 13 for selectively sealing or unsealing the passageway 9 to allow for a flow of fluid between each of said open ends. The valve 13 is operable from the first open end 5 or second open end 7, which is described in more detail below, and selectively allows the passage of fluid through the plumbing fitting.

In the following description, the first open end 5 is the inlet end, which is connected to the elbow 1000 by the connection arrangement 11, and the second open end 7 is the outlet end. However, it will be appreciated that in some contexts, the second end may be the inlet end and the first end may be the outlet end.

With reference to FIGS. 1 to 11, various features of the elongate body 3 will now be described. The elongate body 3 is of a pre-determined length. The length may be about 70 mm to about 250 mm. For example, the length may be about 80 mm, about 90 mm, about 100 mm, about 110 mm, about 120 mm, about 130 mm, about 140 mm, about 150 mm, about 160 mm, about 170 mm, about 180 mm, about 190 mm, about 200 mm, about 210 mm, about 220 mm, about 230 mm, or about 240 mm. The length is chosen based on conventional dimensions and spacing of a wall cavity of a typical building construction together with sufficient length for a user to grip the portion of the plumbing fitting extending out from the wall. In particular, the length is related to the typical distance between the piping (together with the further plumbing fitting connected to the piping) and the exterior of plasterboard or dry wall of the wall being built. When installed and connected to the further plumbing fitting 1000 at the inlet end, the outlet end of the elongate body 3 is located outside of the wall cavity. The other predetermined lengths are based on typical building constructions dimensions. For bespoke constructions having non-traditional dimensions, it will be appreciated that the plumber, builder or construction worker can use a plumbing fitting 1 having relatively longer lengths, which will ensure that the outlet end of the elongate body 3 is located outside of the wall cavity.

Figure 4:
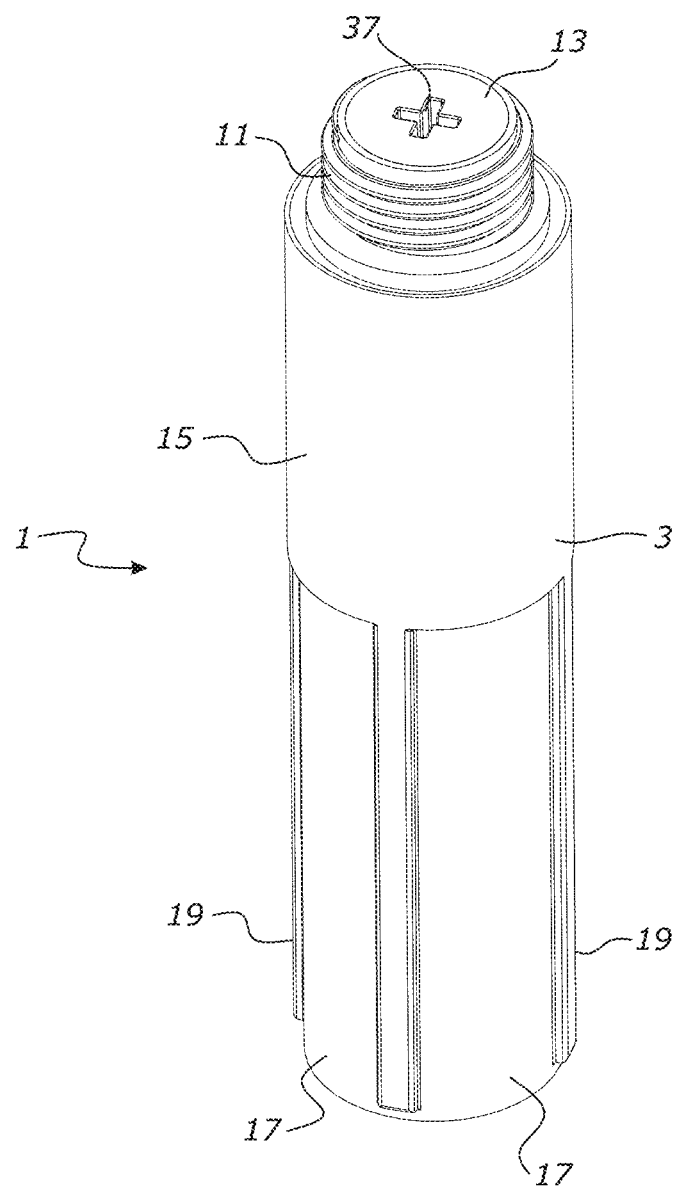
FIG. 4 is a perspective view from the side of the plumbing fitting of FIG. 1.
Figure 5:
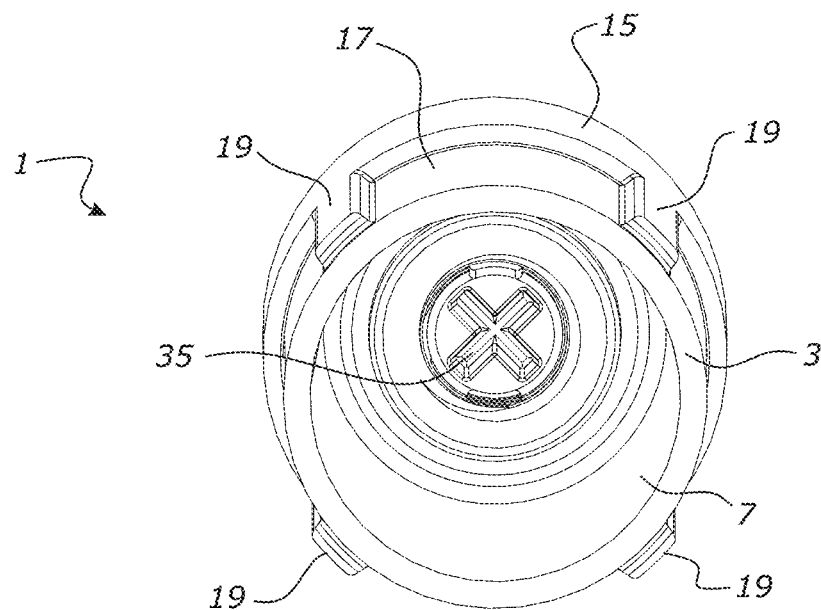
FIG. 5 is a perspective view from the outlet end of the plumbing fitting of FIG. 1.

In addition to the elongate body 3 having a predetermined length, the elongate body 3 has a main smooth region 15 that also has a predetermined length along the elongate body 3. The smooth surface 15 provides a smooth round surface for plastering up to. That is, any plaster that is applied to the plasterboard contacts the main smooth region 15 and not the other portions of the plumbing fitting 1. The main smooth region 15 is a region that has a substantially smooth exterior surface, or a substantially uninterrupted exterior surface. In addition, the main surface is cylindrical. As shown in FIG. 4, only the inlet end of the elongate body 3 comprises of the main smooth region 15.

The main portion 15 is the part of the plumbing fitting 1 that abuts or engages the plasterboard of the wall being built. Again, the predetermined length is related to conventional dimensions and spacing of a wall cavity of a typical building construction. The pre-determined longitudinal length of the main smooth region 15 is a length sufficient to extend from the end connected to the further plumbing fitting or fixture to a location outside or beyond of a wall cavity or a wall cavity to be formed. In particular, the length of the main smooth region 15 is chosen based on the typical distance between the piping and the plasterboard of the wall being built such that the wall contacts the main smooth region 15 and any plaster that is applied to the plasterboard contacts the main smooth region 15 and not the other portions of the plumbing fitting 1. The predetermined length also allows for part of the main smooth region 15 to extend beyond the wall when installed and connected to the further plumbing fitting. The length of the main smooth region 15 is about 40 mm. The length of the main smooth region 15 may also be of any other pre-determined lengths, such as about 25 mm, about 30 mm, about 35 mm, about 45 mm, about 50 mm, or about 55 mm. The other predetermined lengths are based on typical building constructions dimensions. In addition to being smooth, the main portion 15 has a substantially circular profile along its length. The diameter of the elongate body 3 remains constant along that main portion 15.

Figure 6:
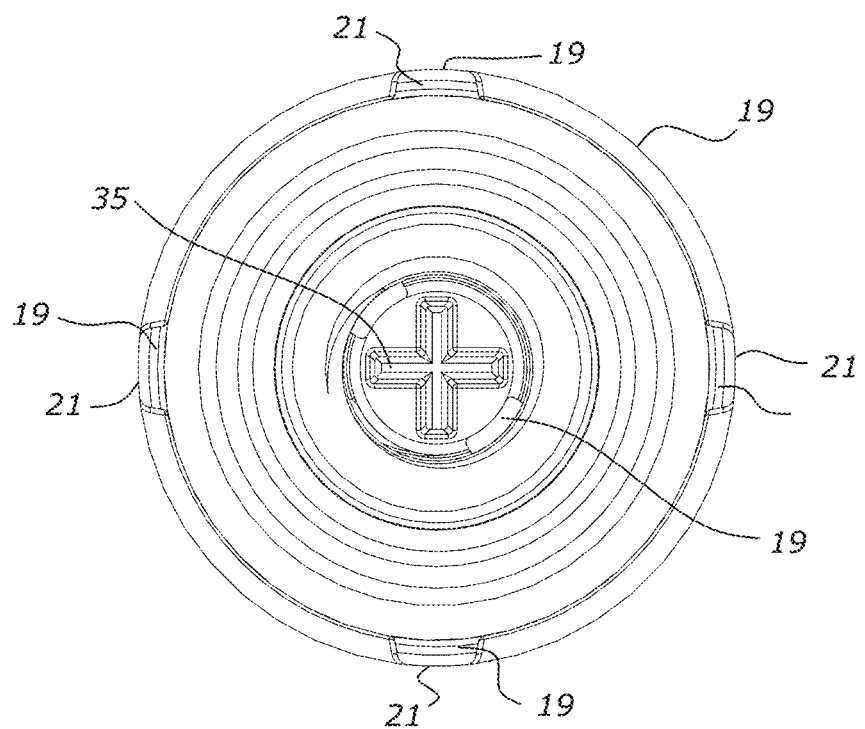
FIG. 6 is an end view from the outlet end of the plumbing fitting of FIG. 1.
Figure 7:
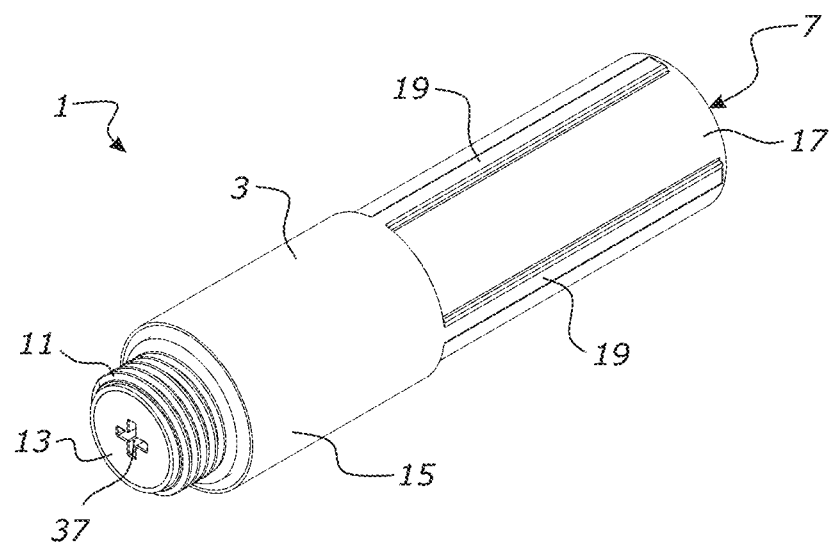
FIGS. 7 to 9 are assembled, partially exploded view, and fully exploded perspective views of the plumbing fitting of FIG. 1.
Figure 8:
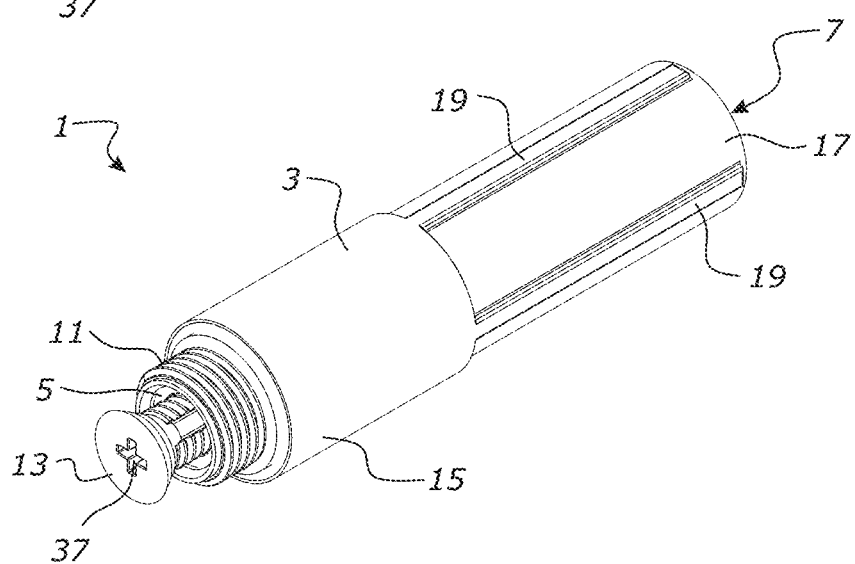
Figure 9:
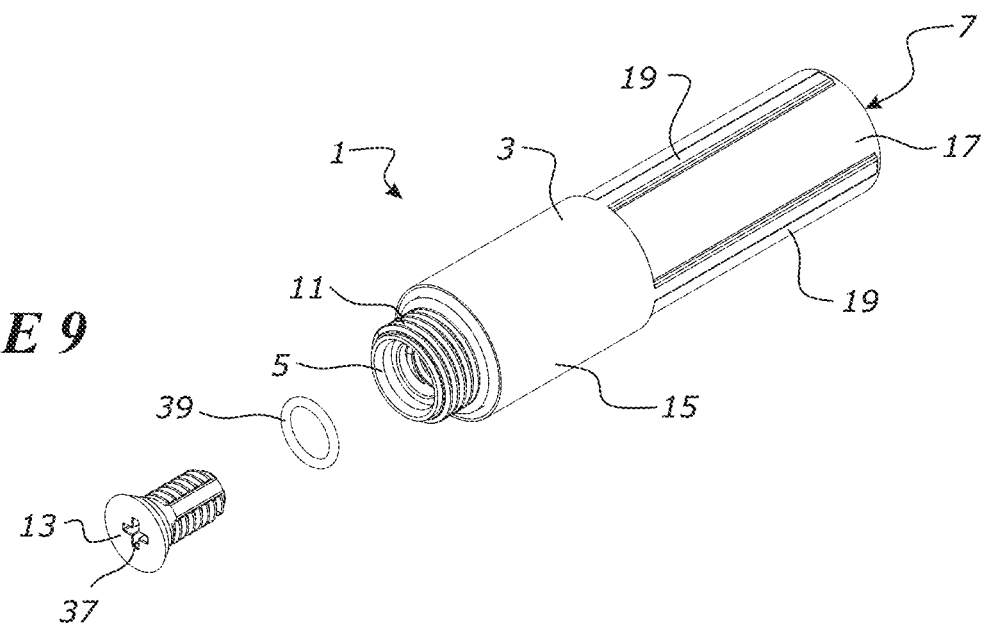

The exterior surface of the elongate body 3 is shaped such that when the plumbing fitting is removed from the elbow, there would be minimal damage, preferably no damage, to any surrounding plaster or wall. As shown in FIG. 6, when the elongate body 3 is viewed in an axial direction between the first open end and the second open end, the main smooth region 15 is substantially circular.

With reference to FIGS. 4 to 9, the section adjacent to the main smooth region 15 is of a maximum outer profile, circumscribed by an axial rotation of said elongate body 3 that is substantially circular. This section may have a profile of any shape along its length provided the maximum outer profile is within the circumscribed area. As a result, when the plumbing fitting 1 is removed by rotating, because there are no features of the plumbing fitting 1 that extend outwardly beyond the circumscribed area, the plumbing fitting 1 will not strike the plasterboard or plaster.

The elongate body 3 has a plurality of exterior surface recesses 17. The recesses 17 are spaced about or along the elongate body 3. In the embodiment shown, the recesses 17 extend substantially longitudinally along the elongate body 3. The recesses 17 are also positioned away from the inlet end. There is a plurality of ridges adjacent the recesses—there is one ridge between a pair of adjacent recesses 17. The ridges and recesses provide a shaped surface that can be grasped by a user to manually attach or detach the plumbing fitting 1 from the elbow 1000. That is, the recesses provide a handle region 16. The length of the handle region is about 60 mm. The length of the handle region 16 may also be of any other pre-determined lengths, such as about 40 mm, about 50 mm, about 70 mm, about 80 mm, or about 90 mm. When viewed axially, the outer surface of the ridges 19 do not extend beyond the smooth region 15. Further, the outer surface 21 of each ridge 19 is curved such that each ridge 19 is flush with the smooth region 15.

With reference to FIG. 4, the connection arrangement 11 is located at the inlet end 5 of the elongate body 3. The connection arrangement 11 extends outwardly from the adjacent main portion of the elongate body 3 and forms the terminal end of the elongate body. A maximum exterior diameter of the connection arrangement 11 is of substantially the same or a reduced exterior diameter with respect to a maximum exterior diameter of said elongate body 3 adjacent to said end of said elongate body. FIGS. 4 to 11 show the connection arrangement 11 has a smaller external diameter than the adjacent section of the elongate body 3. When the plumbing fitting 1 is connected to the elbow 1000, the connection arrangement 11 is located within the passageway of the elbow 1000 while the remainder of the plumbing fitting 1 extends outwardly from the elbow 1000. Consequently, when the plumbing fitting 1 is assembled with the elbow 1000, the main smooth region 15 is substantially flush with the body of the elbow 1000. The connection arrangement 11 is an externally threaded section of the elongate body 3. The connection arrangement is configured to engage with an internally threaded section 1011 of the elbow, shown most clearly in FIG. 2. FIGS. 4 to 12 show the connection arrangement is integral with the elongate body 3.

Figure 10:
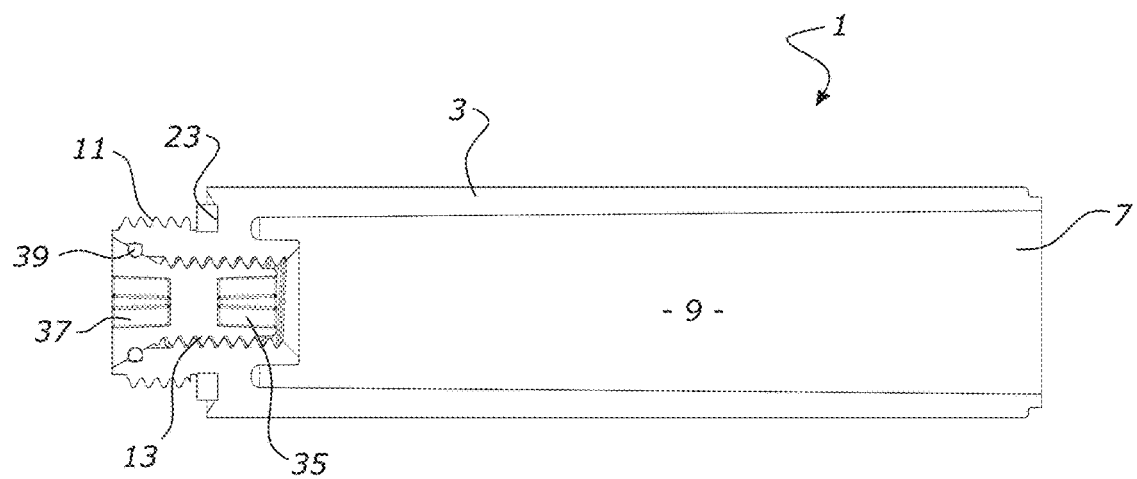
FIGS. 10 to 12 assembled, partially exploded view, and fully exploded cross-sectional views of the plumbing fitting of FIG. 1.
Figure 11:
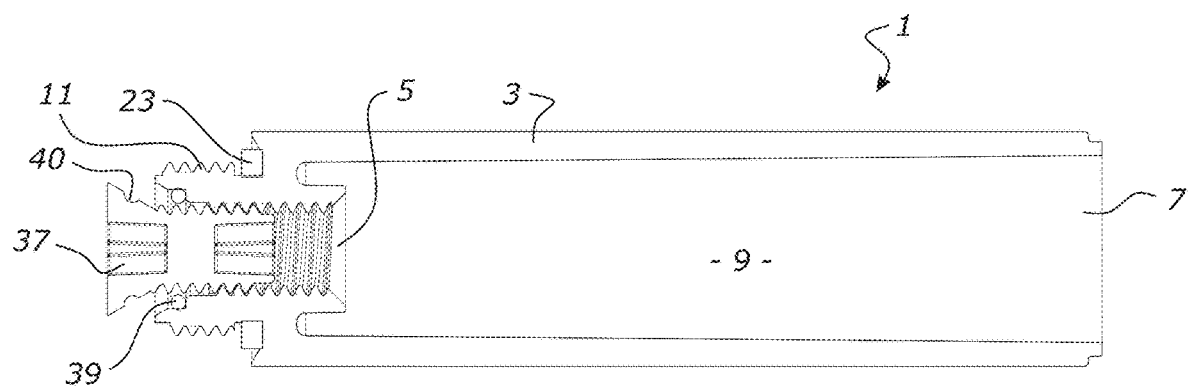
Figure 12:
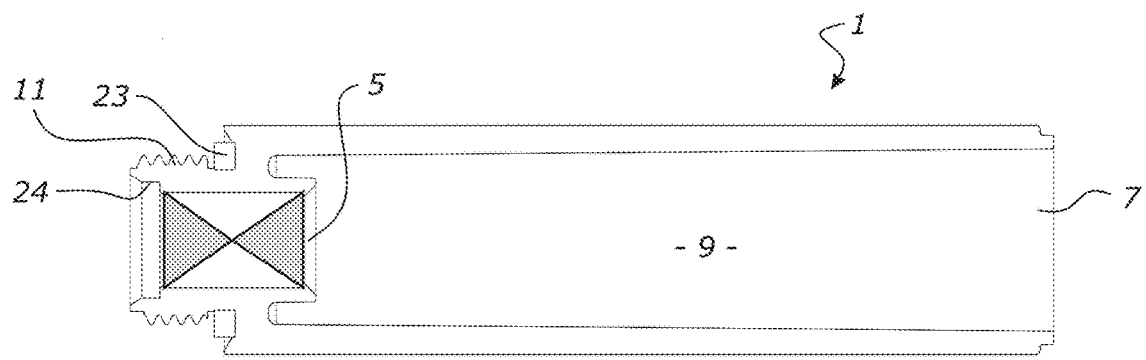

FIGS. 10 to 12 show the plumbing fitting 1 with a first sealing member 23. The first sealing member 23 seals the threaded member against the elbow 1000. In the embodiment shown, the first sealing member 23 is a washer. The washer 23 is received by a recess or groove 25, shown most clearly in FIGS. 14 and 15. The groove 25 is a flat groove when viewed in cross-section as in FIG. 15. That is the surface on which the washer sits has a constant diameter. As described in more detail below in relation to the embodiment shown in FIGS. 2 and 3, the washer 23 is pressed and reshaped when the plumbing fitting is installed on the elbow.

As mentioned above, the plumbing fitting 1 also includes a valve for selectively sealing or unsealing the passageway 9. With reference to FIG. 10, the valve comprises a plug in the form of a screw 13. As can been seen most clearly in FIGS. 7 and 10, the screw 13 is located at the end of the passageway 9.

The inlet 5 has a complementary internally threaded section. The screw 13 has a head 29 and a threaded shank 31. Both the head 29 and the end of the shank 31 have a shaped recess 35, 37 for receiving a tool. The two recesses 35, 37 allow the valve to be operated from either end of the plumbing fitting 1. That is, the recess 37 in the head 29 allows the valve to be operated from the inlet end and the recess 35 in the shank 31 allow the valve to be operated from the outlet end of the plumbing fitting. In the embodiment shown, both shaped recesses 35, 37 are shaped to receive a tool. The tool can be used to rotate the screw, which then moves longitudinally relative to the elongate body 3 to selectively open or close the passageway 9.

To unseal the passageway 9, the screw 13 accessed from the second open end 7 by a tool and is rotated clockwise relative to the elongate body 3. The rotation direction of the screw 13 to unseal the passageway 9 and the rotation direction of the connection arrangement 11 are the same direction. As a result, if the screw 13 seizes, even temporarily, when the screw 13 is being unsealed, the rotational movement of the screw 13 will transfer to the elongate body 3 and will tighten the plumbing fitting 1 onto the elbow 1000. Unsealing the screw 13 will not cause the plumbing fitting to loosen from the elbow 1000.

The shaped recesses 35, 37 are configured to receive a Philips screwdriver. The recesses may be other shapes, such slotted, cruciform, polygon or hexalobular type screw drive. The recesses may be shaped to receive a screwdriver or that shaft of a socket set. The recess 37 in the head 29 may be the same as the recess 35 shape in the shank 31, or they may be different shapes. FIGS. 10 and 11 show the recesses 35, 37 are the same size. Alternatively, the recesses 35, 37 may be different sizes, for example, the recess 37 in the head 29 may be larger than the recess 35 in the shank 31.

The plumbing fitting 1 has a second sealing member or a valve sealing member 39, which is associated with the screw 13. The second sealing member 39 is an O-ring, which is received by a groove 24 (FIG. 10) in the inlet and a groove 40 (FIG. 11) in the screw 13. The second sealing member 39 substantially seals the screw 13 and the inlet 5 when the valve is closed. The second sealing member may be any other type of sealing component such as a wiper seal or gasket that fits between the plug and the passageway 9 of the elongate device. In an alternative embodiment, neither the exterior surface of the screw nor the interior surface of the inlet has a groove and the plumbing fitting does not have a seal. Rather, the exterior surface of the screw has the same taper as the interior surface of the inlet. Further, both surfaces may have a uniform taper. When the screw is completely closed, the contact between the exterior surface of the screw and the internal surface of the inlet will be mating surfaces that seal and a separate seal component is not required.

Figure 19:
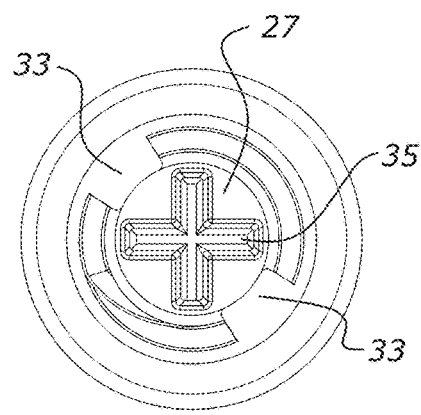
FIG. 19 is a bottom view of the plug of FIG. 16.
Figure 20:
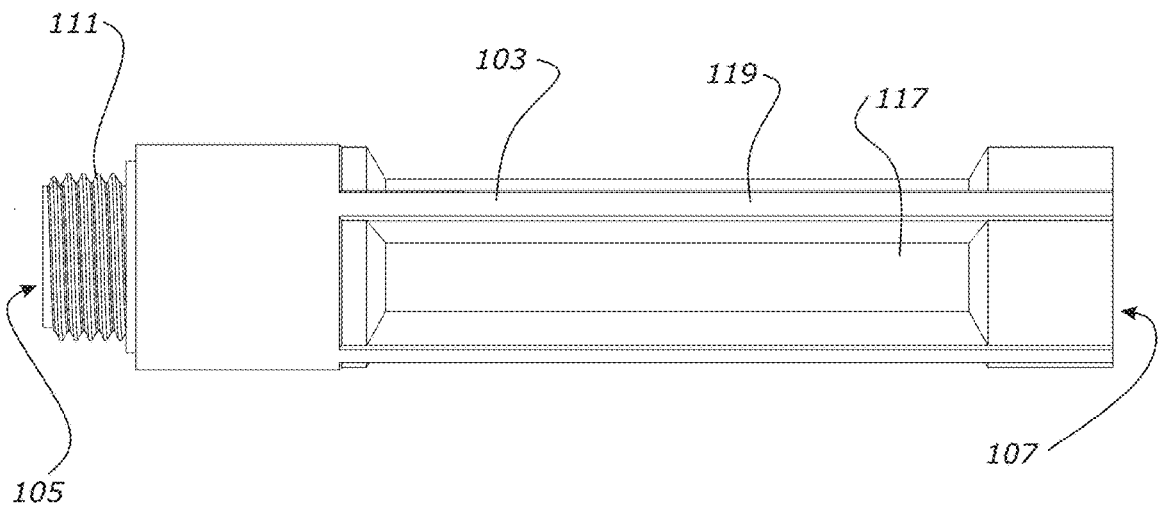
FIG. 20 is a side view of another embodiment of the plumbing fitting.

With reference to FIGS. 16 to 19, the screw comprises at least one drainage channel 33 to allow for the flow of fluid between each of the open ends of the elongate body 3 when the plug is partially unsealed. FIG. 19 shows the plug has two drainage channels 33.

When the screw 13 is closed (FIG. 10), fluid is prevented, or at least substantially inhibited, from entering the passageway 9 because the screw 18 blocks the outlet of the further plumbing fitting 100. When the screw 13 is open (FIG. 11), or partially open, fluid is allowed to flow or drain from the outlet of the further plumbing fitting 100, through the inlet 5, through one or both drainage channels 33, then along the passageway 9 and out the outlet 7. In an alternative embodiment, the screw may not have a drainage channel in the form shown in the drawings. Rather, the water may travel along the screw thread. It will be appreciated that having drainage channels as shown in the figures will allow a greater amount of water to flow through the plumbing fitting compared to an embodiment in which the water travels along the screw thread.

The screw 13 can be operated (sealed or unsealed) from the first end 5 of the elongate body 3 if the connection arrangement at the first end 5 is not connected to the elbow 1000. This means that any adjustments to the screw 13 from the first end 5 of the elongate body 3 are required to occur before or after connecting the elongate body 3 to the elbow 1000. When the connection arrangement 11 at the first end is connected to the elbow 1000, the screw 13 can only be adjusted from the second end 7 of the elongate body 3.

In use, the screw 13 is operated from the inlet end 5 to ensure it is closed. The plumbing fitting can then be attached to the elbow as shown in FIG. 1. When testing is required, the plumbing fitting will block water from leaving the elbow 1000. After testing has finished, the screw 13 can be operated from the outlet end, allowing water to flow from the elbow 1000, along the drainage passages 33 in the screw 13, along the passageway 9 and out the open outlet 7.

Also, after the wall has been completed, the plumbing fitting can be removed by a user manually rotating the plumbing fitting. As previously described, the smooth region 15 allows any plaster to be formed right up against that region. When the plumbing fitting is removed from the elbow the smooth region 15 of the elongate body 3 helps to avoid disrupting the plaster, or at least substantially minimise disruption or damage to the plaster. That is because there is no textured surface or other protrusions that the plaster would adhere to.

With reference to FIG. 12, the valve may take other suitable forms such as a spring valve, a poppet valve, a non-return valve, a check valve, or a lever valve.

Figure 13:
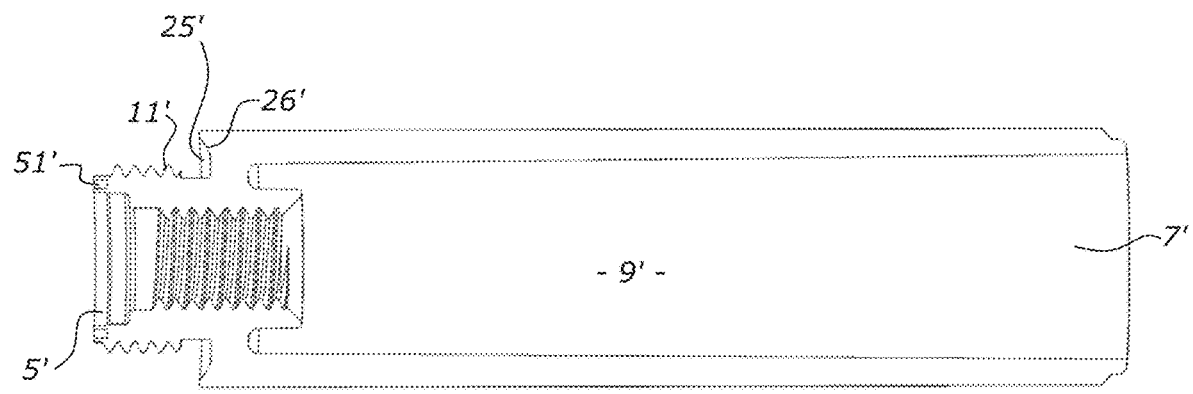
FIG. 13 is a cross-sectional view of the elongate body of the plumbing fitting of FIG. 2.
Figure 14:
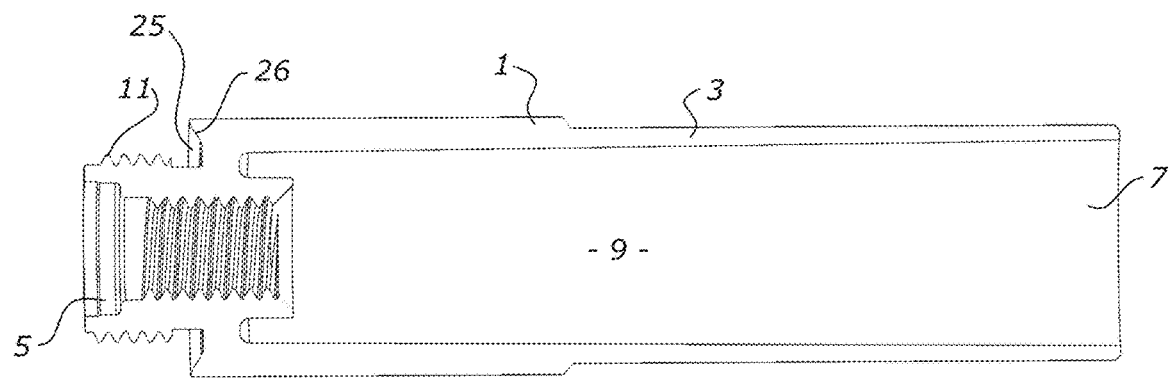
FIG. 14 is a cross-sectional view of the elongate body of the plumbing fitting of FIG. 1.
Figure 15:
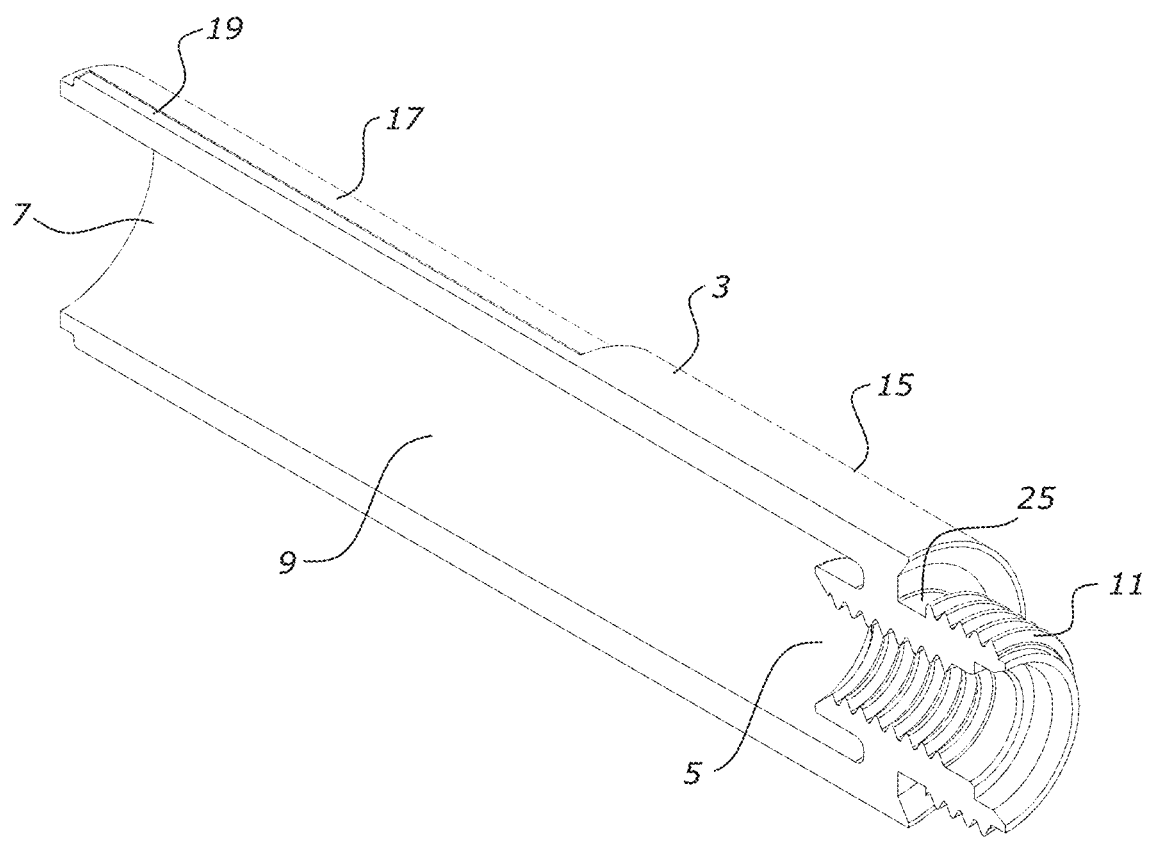
FIG. 15 is a cross-sectional perspective view of the elongate body of the plumbing fitting of FIG. 1.
Figure 16:
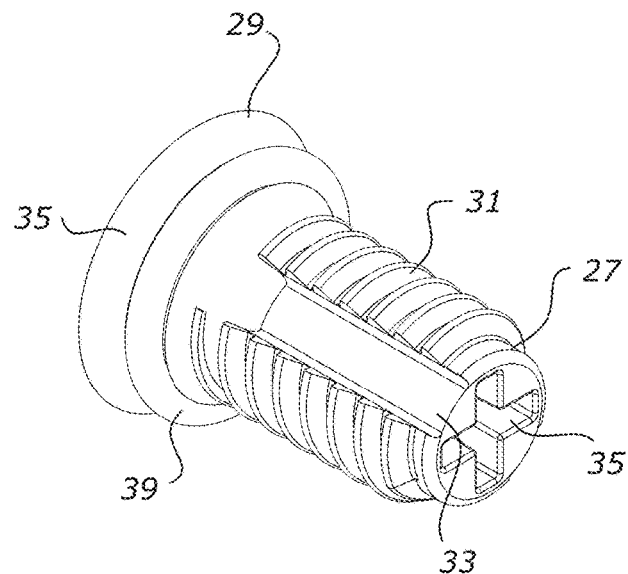
FIG. 16 is a perspective view of the plug of the plumbing fitting of FIG. 1.
Figure 17:
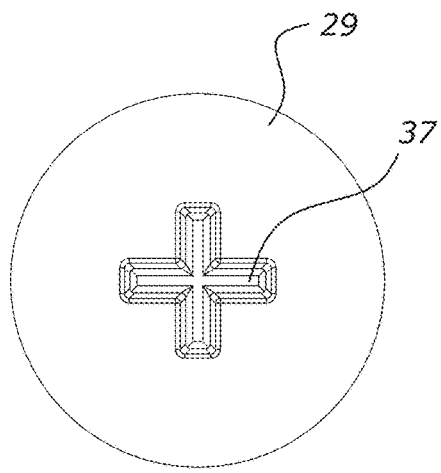
FIG. 17 is a top view of the plug of FIG. 16.
Figure 18:
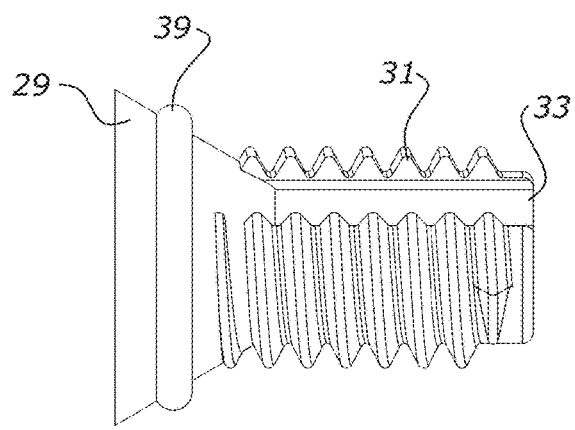
FIG. 18 is a side view of the plug of FIG. 16.

FIGS. 2, 3 and 13 show another exemplary form of the plumbing fitting. Unless described below, the features and functions of this embodiment are the same as the first embodiment shown and described above in relation to FIG. 1. Like numbers are used to indicated like parts with the addition of ' after each reference numeral. In this embodiment, the plumbing fitting 1' has a plurality of recesses 51'. The recesses 51' are driving dogs that used during the manufacturing process. The plumbing fitting 1, 1' is made in a mould with a threaded core that forms the internally threaded section of the inlet 5, 5'. When the mould opens, the threaded core unscrews by rotating relative to the mould. The driving dogs 51' are used during the moulding process to stop the elongate body 3 from rotating relative to the mould when the threaded core is being removed.

FIG. 2 shows the plumbing fitting 1' before being attached to the elbow and FIG. 3 shows the plumbing fitting 1' attached to the elbow. In FIG. 3, it can be seen that the washer 23' is pressed and reshaped between the elongate body 3' and the face 1025 of the elbow when the plumbing fitting 1' is attached to the elbow 1000. The washer 23' is fully entrapped. FIG. 3 shows the washer 23' is deformed by extending outwardly towards the angled face 26' of the groove 25'. The angled face 26' prevents the washer 23' from extending beyond the perimeter of the elongate body 3'. In addition to extending outwardly when pressed, the depth of the washer 23' reduces. In addition, the washer 23' takes on the shape of the end of the plumbing fitting. The washers 23, 123, 223, and 323 of the other embodiments described herein have the same features and functions as the washer 23'.

FIGS. 20 to 23 show another exemplary form of the plumbing fitting. Unless described below, the features and functions of this embodiment are the same as the embodiment shown and described above in relation to FIG. 1. Like numbers are used to indicated like parts with the addition of 100.

In this embodiment, each of the first end and the second end has a connection arrangement. A first connection arrangement 111 has the same form and function as the connection arrangement of the first embodiment described above. The second connection arrangement 141 has an internal thread. Each of the two connection arrangements includes a first sealing member 123, 143. The two connection arrangements 111, 141 allow either end of the elongate member to be the inlet end with the other end as the outlet end. The second connection arrangement 141 can receive an external threaded outlet of any other suitable plumbing fitting, coupling or fixture. That is, this embodiment of the plumbing fitting can be used with either a plumbing fitting with external threads (a male plumbing fitting) or a plumbing fitting with internal threads (a female plumbing fitting).

In addition, if required, the connection arrangements allow multiple plumbing fittings to connect to each other serially. The second connection arrangement 141 with the internal thread can receive the first connection arrangement 111 of an additional plumbing fitting 1.

Figure 21:
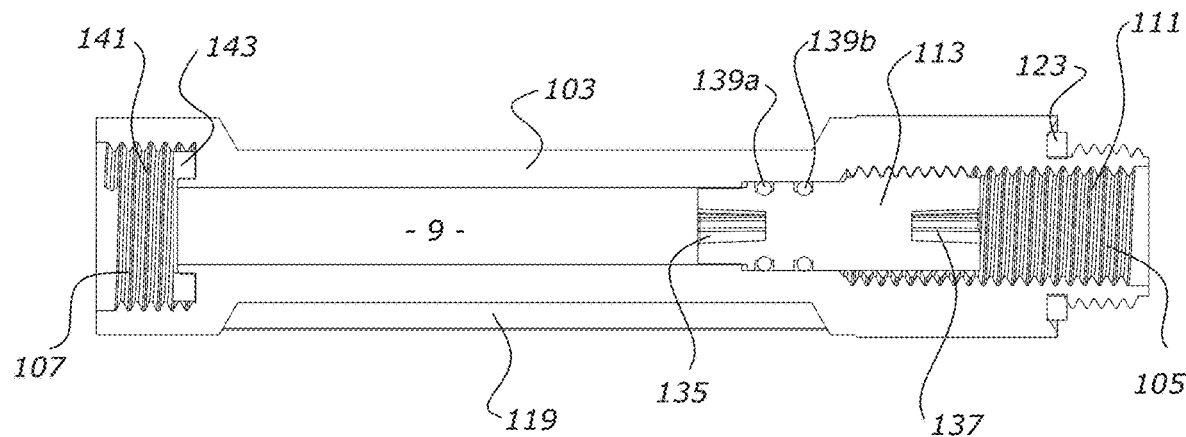
FIG. 21 is a cross section of the plumbing fitting of FIG. 20.
Figure 22:
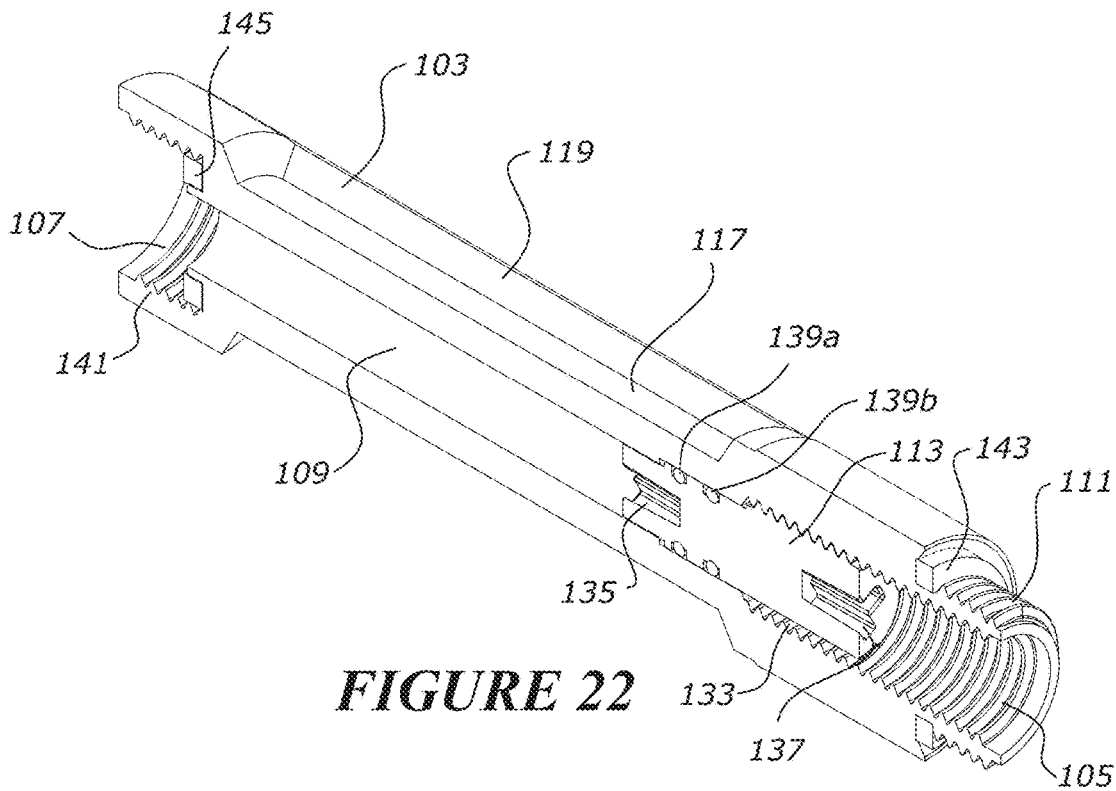
FIG. 22 is a perspective cross section view from the inlet end of the plumbing fitting of FIG. 20.
Figure 23:
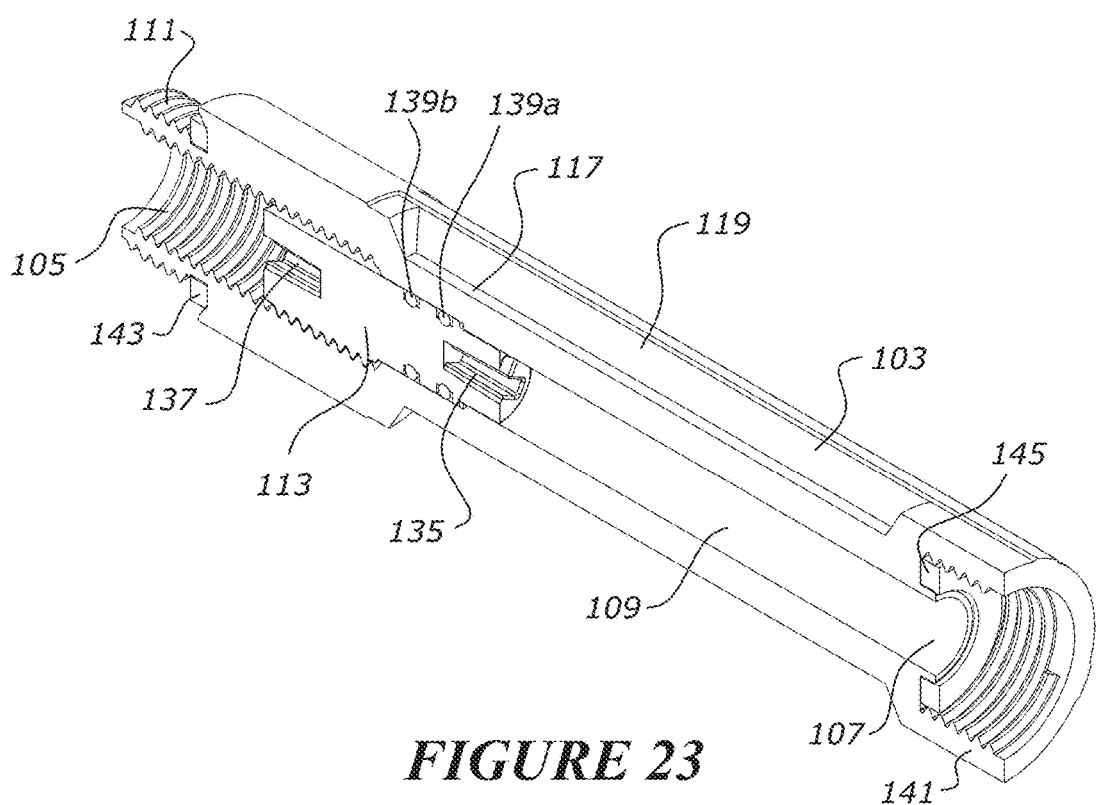
FIG. 23 is a perspective cross section view from the outlet end of the plumbing fitting of FIG. 20.
Figure 24:
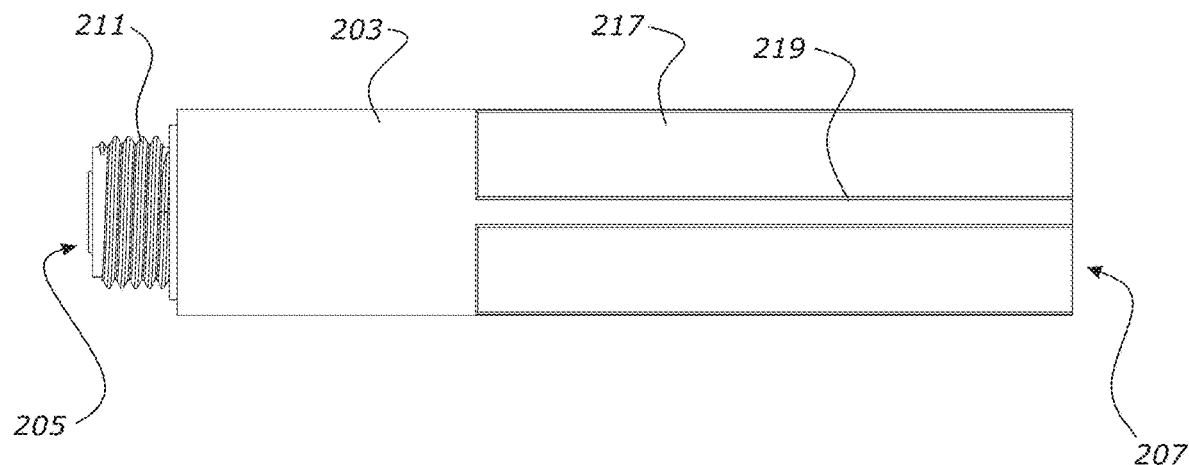
FIG. 24 is a side view of another embodiment of the plumbing fitting.
Figure 25:
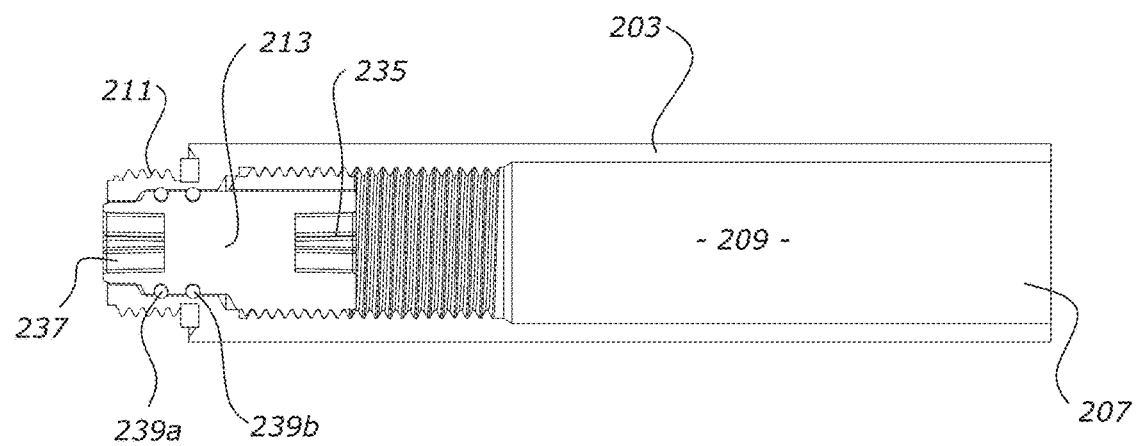
FIG. 25 is a cross section of the plumbing fitting of FIG. 24.
Figure 26:
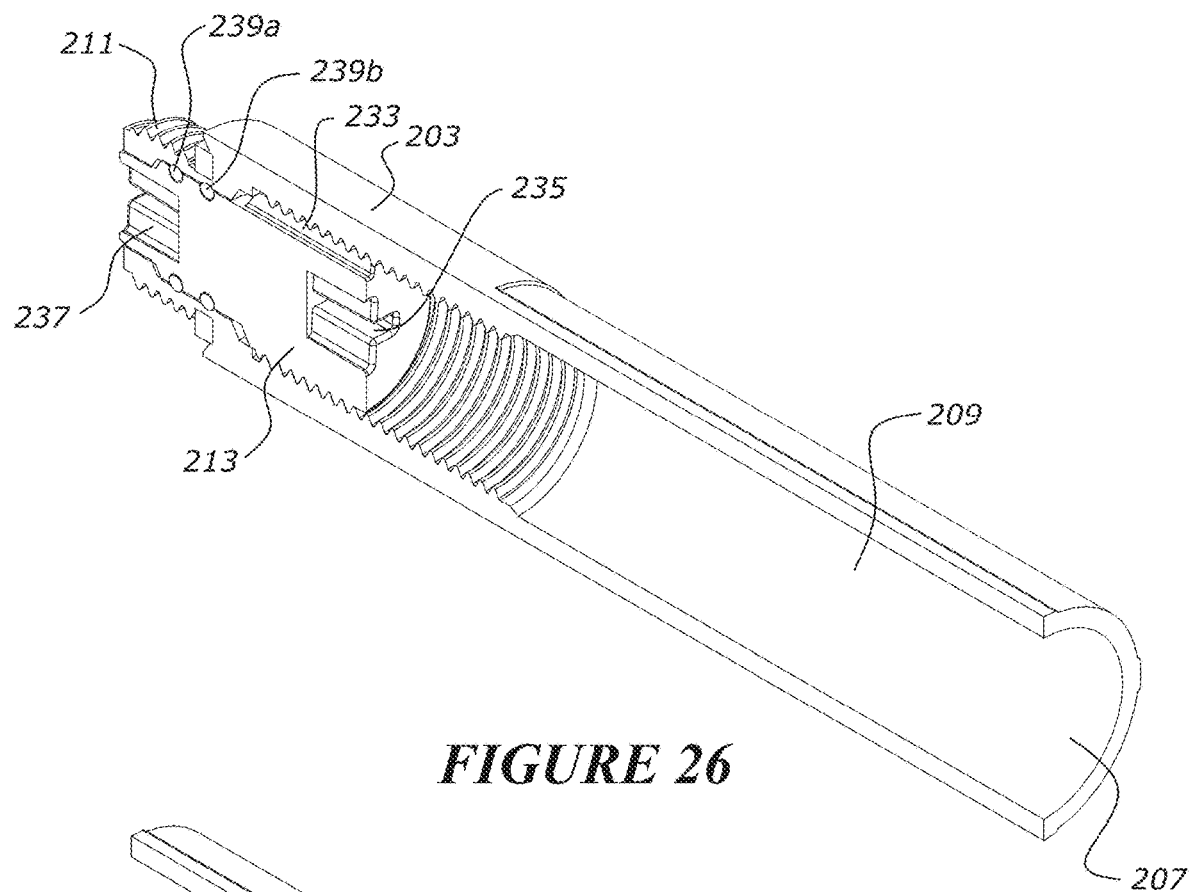
FIG. 26 is a perspective cross section view from the inlet end of the plumbing fitting of FIG. 24.
Figure 27:
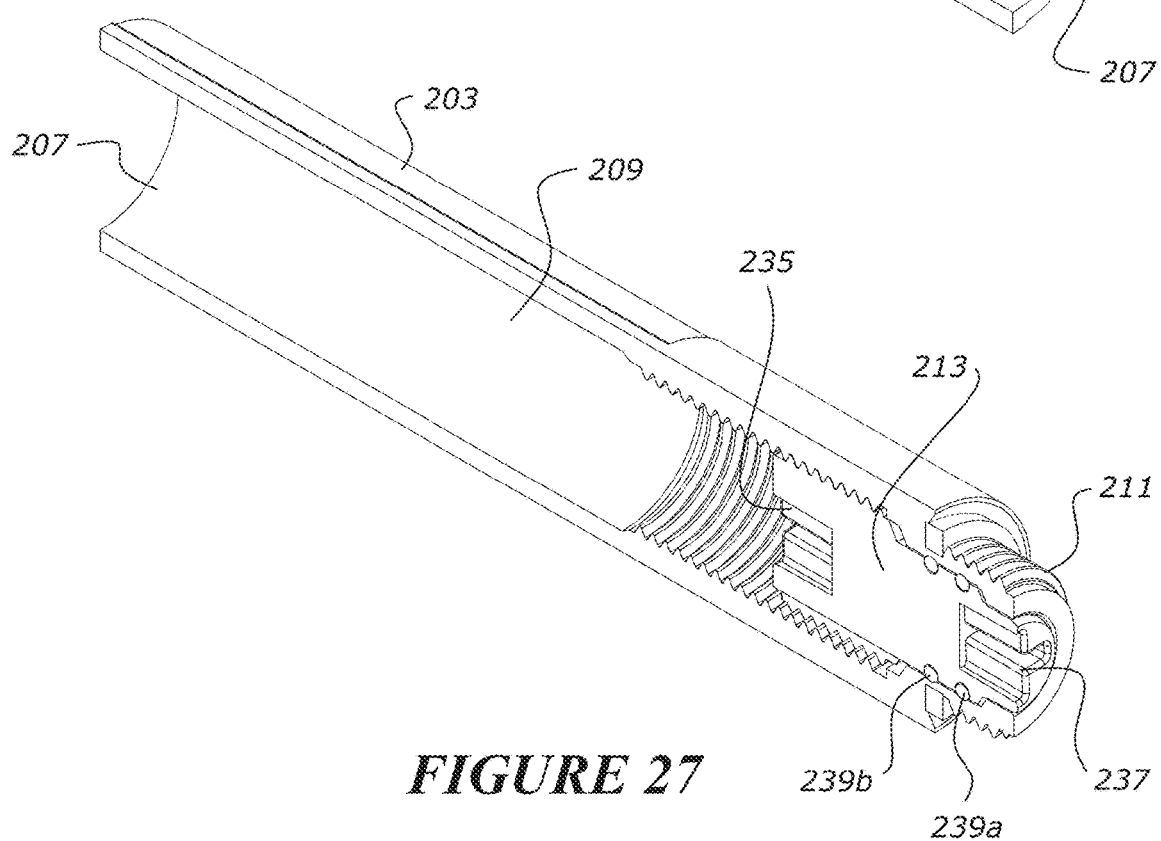
FIG. 27 is a perspective cross section view from the outlet end of the plumbing fitting of FIG. 24.
Figure 28:
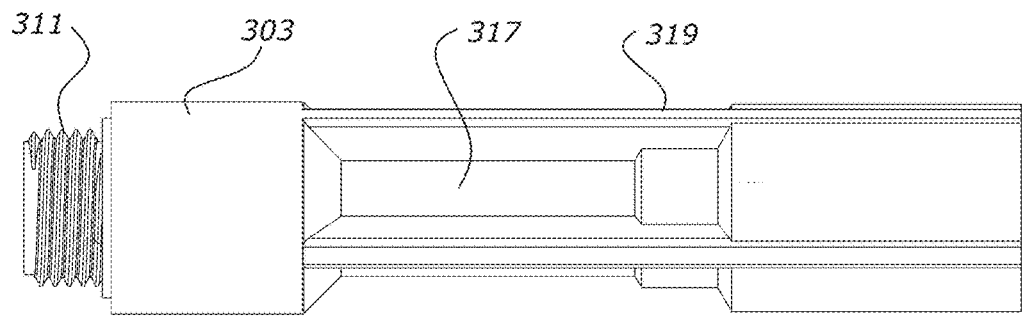
FIG. 28 is a side view of another embodiment of the plumbing fitting.
Figure 29:
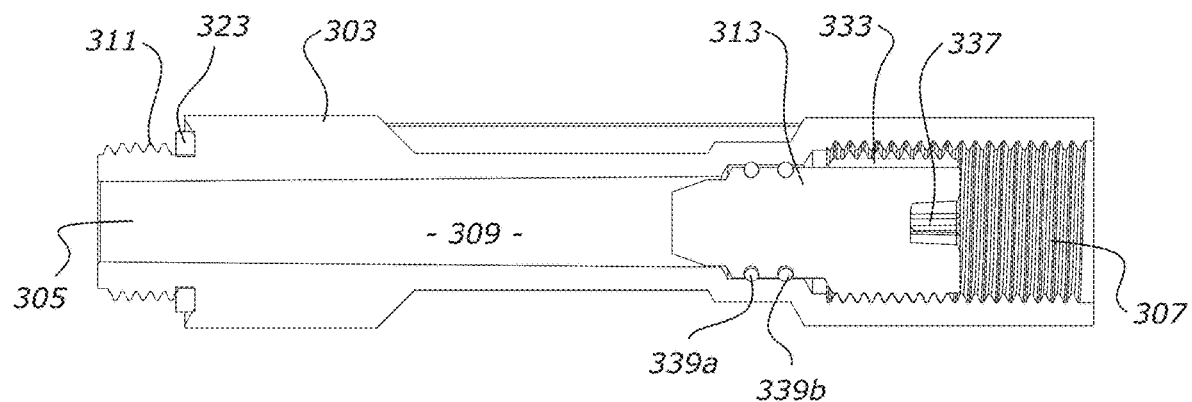
FIG. 29 is a cross section of the plumbing fitting of FIG. 28.
Figure 30:
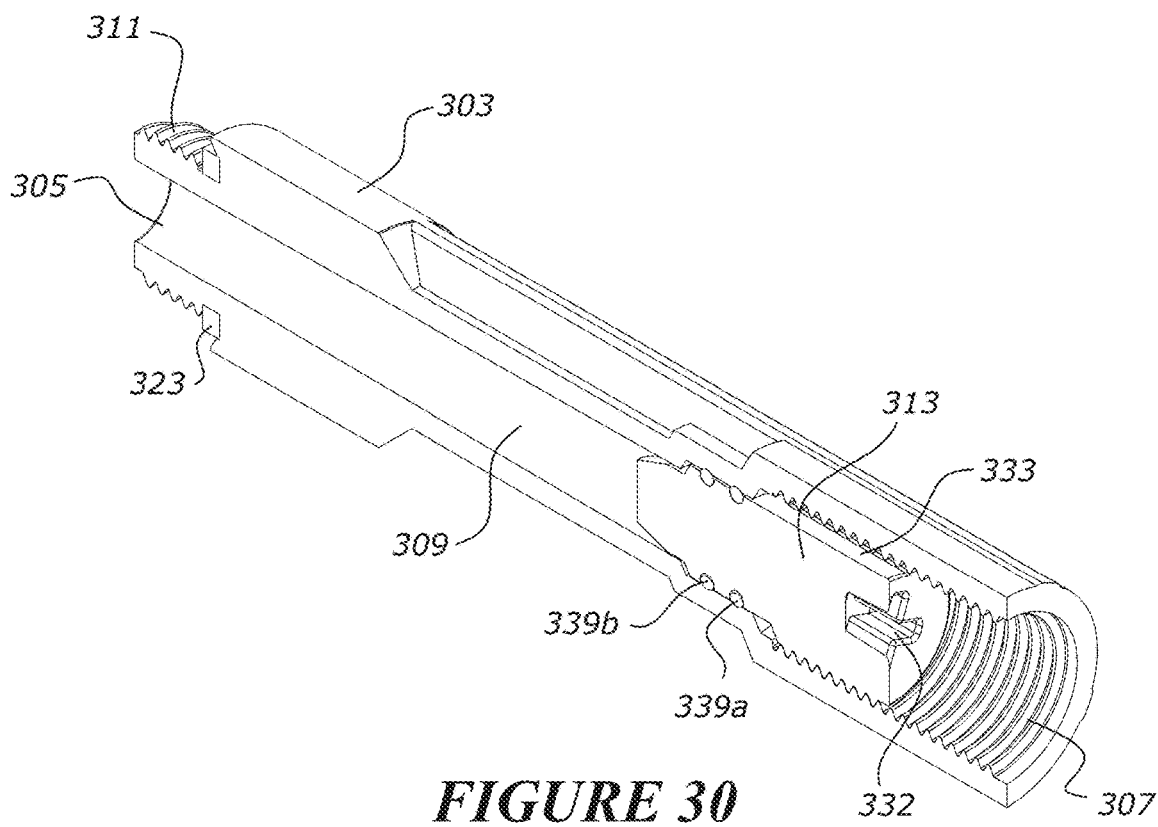
FIG. 30 is a perspective cross section view from the inlet end of the plumbing fitting of FIG. 28.
Figure 31:
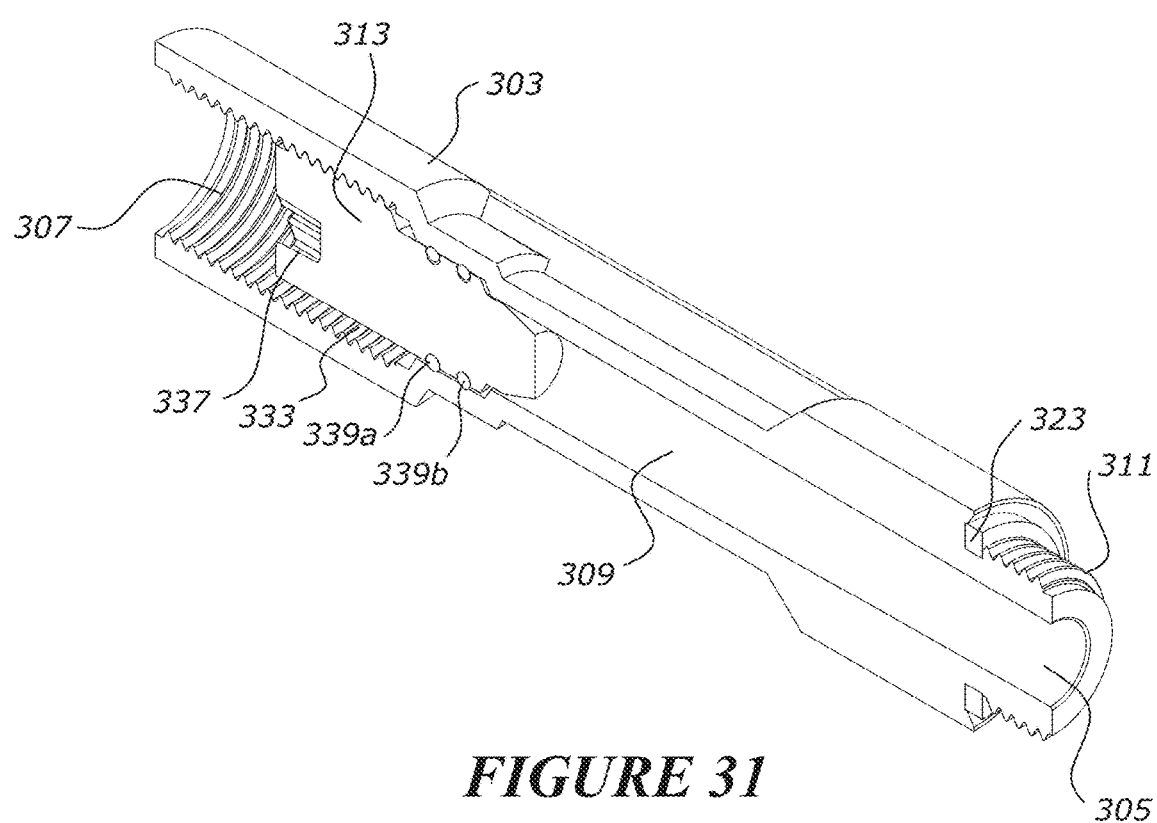
FIG. 31 is a perspective cross section view from the outlet end of the plumbing fitting of FIG. 28.

In this embodiment, the valve is in the form of a grub screw 113. As the valve is a grub screw 113, the valve may be located inwardly from the inlet 105. The grub screw 113 has a threaded portion and an unthreaded or smooth portion. Both ends of the grub screw have a shaped recess for receiving a tool. The grub screw 113 has two second sealing members 139a, 139b between the grub screw 113 and the passageway 109. In an alternative configuration, there may be only one second sealing member or more than two second sealing members. The sealing members may be O-rings, as shown in FIG. 21, or may be wiper seals or gaskets.

FIGS. 28 to 31 show another exemplary form of the plumbing fitting. Unless described below, the features and functions of this embodiment are the same as the first embodiment described above. Like numbers are used to indicated like parts with the addition of 200.

In this embodiment, there is a connection arrangement 211 at the inlet end 205. The outlet end does not have a connection arrangement. The valve is a grub screw 213, similar to the valve of the embodiment shown and described in relation to FIGS. 20 to 23. The grub screw 213 is only insertable into the passageway 209 from the outlet end 207 of the elongate body 203.

FIGS. 28 to 31 show another exemplary form of the plumbing fitting. Unless described below, the features and functions of this embodiment are the same as the first embodiment described above. Like numbers are used to indicated like parts with the addition of 300.

In this embodiment, there is a connection arrangement 311 at the inlet end 305. The outlet end does not have a connection arrangement. The valve is a grub screw 313, similar to the valve of the embodiment shown and described in relation to FIGS. 20 to 23 and the embodiment shown and described in relation to FIGS. 24 to 27. In this embodiment, the grub screw 313 is only engageable from the side facing the outlet end 307 of the elongate body 303. The grub screw 313 is only insertable into the passageway 309 from the outlet end 307 of the elongate body 303.

Preferred embodiments of the invention have been described by way of example only and modifications may be made thereto without departing from the scope of the invention.

For example, the plumbing fitting has been shown and described as having a plurality of recesses. In an alternative embodiment, the plumbing fitting may have a single recess.

Each of the embodiments of the plumbing fitting may have different connection arrangements to those described above. In some configurations, both ends may have a connection arrangement with external threads, both ends may have a connection arrangement with internal threads, only one end may have an internal thread, or only one end may have an external thread.

The embodiments described herein have a substantially smooth exterior surface at one end of the elongate body 3. In other configurations, each end of the elongate body may have a substantially smooth exterior surface, or a substantially uninterrupted exterior surface. This means that both the first end and the second end of the elongate body may have smooth regions that have a substantially smooth exterior surface or a substantially uninterrupted exterior.

The plumbing fitting may be provided with a variety of different connection arrangements. Either ends of the elongate body may be used as the inlet or outlet. Both ends of the elongate body may be connected to a further plumbing fitting each or only one end of the elongate body is connected to a further plumbing fitting. The end with the connection arrangement with internal threads may be used to connect to a further plumbing fitting or fixture with external threads. The end with the external threads may be used to connect to a further plumbing fitting or fixture with internal threads. In other words, the elongate body has connection arrangements that can accommodate for both female and male connections.

The invention claimed is:

1. A plumbing fitting for selectively allowing passage of a fluid therethrough, said plumbing fitting comprising:
    an elongate body comprising a first open end and a second open end, with a passageway providing for fluid communication between each of said first open end and said second open end;
    said first open end comprising a connection arrangement for connection with a further plumbing fitting or fixture; and
    a valve located at the first open end for selectively sealing or unsealing said passageway to allow for a flow of fluid between each of said open ends, the valve comprising a head and a shank, the head having a first recess and the shank having a second recess;
    wherein the valve is operable by engagement of the first recess from the first open end or the second recess through the second open end by a tool, said valve being a rotatable valve for threaded connection with the elongate body, and the valve being rotatable for selectively sealing or unsealing said passageway to allow for the flow of fluid between each of said open ends,
    wherein a rotation direction of the valve to unseal said passageway and a rotation direction of the connection arrangement to tighten the elongate body to the further plumbing fitting are the same direction.

2. The fitting as claimed in claim 1, wherein said elongate body is of a pre-determined length.

3. The fitting as claimed in claim 2, wherein the pre-determined length is sufficient for said elongate body, when connected to the further plumbing fitting or fixture, to provide for one of said open ends to be located outside of a wall cavity or a wall cavity to be formed.

4. The fitting as claimed in claim 1, wherein when the elongate body is viewed in an axial direction between said first open end and said second open end, an exterior surface:
   i. is substantially circular, or
   ii. is of a profile, or is of a maximum outer profile, circumscribed by an axial rotation of said elongate body that is substantially circular, or
   iii. is shaped such that a maximum exterior diameter of said elongate body provided for connection with the further plumbing fitting or fixture is of substantially the same or a reduced exterior diameter with respect to a maximum exterior diameter of said elongate body adjacent to either the first open end or the second open end of said elongate body provided for the connection to the further plumbing fitting or fixture.

5. The fitting as claimed in claim 1, wherein an end of said elongate body provided for connection to the further plumbing fitting of fixture is of a reduced maximum exterior diameter with respect to the remainder of said elongate body.

6. The fitting as claimed in claim 1, wherein one of said first open end or said second open end is of a smaller maximum exterior diameter with respect to the other open end.

7. The fitting as claimed in claim 1, wherein one end of said elongate body comprises a region.

8. The fitting as claimed in claim 7, wherein the region of an end of said elongate body is provided for connection with the further plumbing fitting or fixture and has a substantially smooth exterior surface, or a substantially uninterrupted exterior surface.

9. The fitting as claimed in claim 8, wherein each end of said elongate body comprises of said region, each of said regions being of a substantially smooth exterior surface, or a substantially uninterrupted exterior surface.

10. The fitting as claimed in claim 8, wherein the region is provided directly at an end and extends for a pre-determined longitudinal length along said elongate body.

11. The fitting as claimed in claim 10, wherein said pre-determined longitudinal length is a length sufficient to extend from the end connected to the further plumbing fitting or fixture to a location outside or beyond of a wall cavity or a wall cavity to be formed.

12. The fitting as claimed in claim 1, wherein said elongate body comprises of one or more exterior surface recesses, said recesses spaced about or along the elongate body.

13. The fitting as claimed in claim 12, wherein one or more of said recesses:
   extends substantially longitudinally along said elongate body, and/or
   extends substantially radially about said elongate body, and/or
   are positioned between each of said first open end and said second open end.

14. The fitting as claimed in claim 12, wherein said one or more exterior surface recesses are positioned away from an end which is to be connected to the further plumbing fitting or fixture.

15. The fitting as claimed in claim 1, wherein the connection arrangement for connection with the further plumbing fitting or fixture comprises a threaded member configured to attach to the further plumbing fitting or fixture.

16. The fitting as claimed in claim 15, wherein a first sealing member seals the threaded member against the plumbing fitting.

17. The fitting as claimed in claim 16, wherein the first sealing member is a washer.

18. The fitting as claimed in claim 1, wherein the elongate body comprises a groove around the circumference of the first open end.

19. The fitting as claimed in claim 18, wherein a first sealing member sits in the groove.

20. The fitting as claimed in claim 1, wherein the valve is located at one of the following:
   the first open end, or
   the second open end, or
   between the first open end and the second open end.

21. The fitting as claimed in claim 1, wherein the valve comprises a plug, and a second sealing member.

22. The fitting as claimed in claim 21, wherein the plug seals the valve and can be unsealed by the tool inserted from the first open end and/or the second open end.

23. The fitting as claimed in claim 21, wherein the plug comprises at least one drainage channel.

24. The fitting as claimed in claim 21, wherein the plug is a screw.

25. The fitting as claimed in claim 24, wherein the screw is receivable or engageable by the tool.

26. The fitting as claimed in claim 24, wherein the screw is located at one of the following:
   the first open end, or
   the second open end, or
   between the first open end and the second open end.

27. The fitting as claimed in claim 24, wherein the screw is operable by the tool inserted from the first open end and/or the second open end.

28. The fitting as claimed claim 24, wherein the screw comprises at least one drainage channel.

29. The fitting as claimed in claim 21, wherein the second sealing member is an O-ring.

30. The fitting as claimed in claim 1, wherein releasing the valve allows fluid in the plumbing fitting to flow from the first open end to the second open end.

31. The fitting as claimed in claim 1, wherein the first open end comprises the connection arrangement for connection with the further plumbing fitting or fixture.

32. The fitting as claimed in claim 1, wherein the second open end is an outlet end.

33. The fitting as claimed in claim 32, wherein the second open end comprises a sealing washer.

34. The fitting as claimed in claim 1, wherein said connection arrangement is configured for rotatable connection with the further plumbing fitting or fixture.

35. The fitting as claimed in claim 1, wherein the connection arrangement is a threaded connection and the valve is a rotatable valve, each comprising of a threaded connection.

36. A plumbing fitting for selectively allowing passage of a fluid therethrough, said plumbing fitting comprising:
   an elongate body comprising a first open end and a second open end, with a passageway providing for fluid communication between each of said first open end and said second open end;
   at least one of said first open end or said second open end, or both of the first open end and the second open end, comprises a connection arrangement for threaded connection with a further plumbing fitting or fixture; and a valve for selectively sealing or unsealing said passageway to allow for a flow of fluid between each of said open ends, the valve being operable from the first open end or the second open end;
wherein said elongate body comprises of one or more exterior surface recesses, said recesses spaced about or along the elongate body.

37. The fitting as claimed in claim 36, wherein one or more of said recesses:
extends substantially longitudinally along said elongate body, and/or
extends substantially radially about said elongate body, and/or
are positioned between each of said first open end and said second open end.

38. The fitting as claimed in claim 36, wherein said one or more exterior surface recesses are positioned away from an end which is to be connected to the further plumbing fitting or fixture.

39. The fitting as claimed in claim 36, wherein said elongate body is of a pre-determined length.

40. The fitting as claimed in claim 39, wherein the pre-determined length is sufficient for said elongate body, when connected to the further plumbing fitting or fixture, to provide for one of said open ends to be located outside of a wall cavity or a wall cavity to be formed.

41. The fitting as claimed in claim 36, wherein when the elongate body is viewed in an axial direction between said first open end and said second open end, an exterior surface:
   i. is substantially circular, or
   ii. is of a profile, or is of a maximum outer profile, circumscribed by an axial rotation of said elongate body that is substantially circular, or
   iii. is shaped such that a maximum exterior diameter of said elongate body provided for connection with the further plumbing fitting or fixture is of substantially the same or a reduced exterior diameter with respect to a maximum exterior diameter of said elongate body adjacent to either the first open end or the second open end of said elongate body provided for the connection to the further plumbing fitting or fixture.

42. The fitting as claimed in claim 36, wherein an end of said elongate body provided for connection to the further plumbing fitting of fixture is of a reduced maximum exterior diameter with respect to the remainder of said elongate body.

43. The fitting as claimed in claim 36, wherein one of said first open end or said second open end is of a smaller maximum exterior diameter with respect to the other open end.

44. The fitting as claimed in claim 36, wherein one end of said elongate body comprises a region.

45. The fitting as claimed in claim 44, wherein the region of an end of said elongate body is provided for connection with the further plumbing fitting or fixture and has a substantially smooth exterior surface, or a substantially uninterrupted exterior surface.

46. The fitting as claimed in claim 45, wherein each end of said elongate body comprises of said region, each of said regions being of a substantially smooth exterior surface, or a substantially uninterrupted exterior surface.

47. The fitting as claimed in claim 45, wherein the region is provided directly at an end and extends for a pre-determined longitudinal length along said elongate body.

48. The fitting as claimed in claim 47, wherein said pre-determined longitudinal length is a length sufficient to extend from the end connected to the further plumbing fitting or fixture to a location outside or beyond of a wall cavity or a wall cavity to be formed.

49. The fitting as claimed in claim 36, wherein the connection arrangement for connection with the further plumbing fitting or fixture comprises a threaded member configured to attach to the further plumbing fitting or fixture.

50. The fitting as claimed in claim 36, wherein a first sealing member seals the threaded member against the plumbing fitting.

51. The fitting as claimed in claim 50, wherein the first sealing member is a washer.

52. The fitting as claimed in claim 36, wherein the elongate body comprises a groove around the circumference of the first open end.

53. The fitting as claimed in claim 52, wherein a first sealing member sits in the groove.

54. The fitting as claimed in claim 36, wherein the valve is located at one of the following:
the first open end, or
the second open end, or
between the first open end and the second open end.

55. The fitting as claimed in claim 36, wherein the valve comprises a plug, and a second sealing member.

56. The fitting as claimed in claim 55, wherein the plug seals the valve and can be unsealed by a tool inserted from the first open end and/or the second open end.

57. The fitting as claimed in claim 55, wherein the plug comprises at least one drainage channel.

58. The fitting as claimed in claim 55, wherein the plug is a screw.

59. The fitting as claimed in claim 58, wherein the screw is receivable or engageable by a tool.

60. The fitting as claimed in claim 58, wherein the screw is located at one of the following:
the first open end, or
the second open end, or
between the first open end and the second open end.

61. The fitting as claimed in claim 58, wherein the screw is operable by a tool inserted from the first open end and/or the second open end.

62. The fitting as claimed claim 58, wherein the screw comprises at least one drainage channel.

63. The fitting as claimed in claim 55, wherein the second sealing member is an O-ring.

64. The fitting as claimed in claim 36, wherein releasing the valve allows fluid in the plumbing fitting to flow from the first open end to the second open end.

65. The fitting as claimed in claim 36, wherein the first open end comprises the connection arrangement for connection with the further plumbing fitting or fixture.

66. The fitting as claimed in claim 36, wherein the second open end is an outlet end.

67. The fitting as claimed in claim 66, wherein the second open end comprises a sealing washer.

68. The fitting as claimed in claim 36, wherein said connection arrangement is configured for rotatable connection with the further plumbing fitting or fixture.

69. The fitting as claimed in claim 36, wherein said valve is a rotatable valve for selectively sealing or unsealing said passageway to allow for a flow of fluid between each of said open ends.

70. The fitting as claimed in claim 69, wherein a rotation direction of the valve to unseal said passageway and a rotation direction of the connection arrangement to tighten the elongate body to the further plumbing fitting are the same direction.

71. The fitting as claimed in claim 36, wherein the connection arrangement is a threaded connection and the valve is a rotatable valve, each comprising of a threaded connection.

\* \* \* \* \*